(12) United States Patent
Rusanovskyy et al.

(10) Patent No.: US 11,849,133 B2
(45) Date of Patent: Dec. 19, 2023

(54) LOW COMPLEXITY HISTORY USAGE FOR RICE PARAMETER DERIVATION FOR HIGH BIT-DEPTH VIDEO CODING

(71) Applicant: QUALCOMM Incorporated, San Diego, CA (US)

(72) Inventors: Dmytro Rusanovskyy, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/547,015

(22) Filed: Dec. 9, 2021

(65) Prior Publication Data
US 2022/0191529 A1 Jun. 16, 2022

Related U.S. Application Data

(60) Provisional application No. 63/124,013, filed on Dec. 10, 2020.

(51) Int. Cl.
*H04N 19/44* (2014.01)
*H04N 19/132* (2014.01)
*H04N 19/176* (2014.01)
*H04N 19/70* (2014.01)
(Continued)

(52) U.S. Cl.
CPC ........... *H04N 19/44* (2014.11); *H04N 19/105* (2014.11); *H04N 19/132* (2014.11); *H04N 19/176* (2014.11); *H04N 19/18* (2014.11); *H04N 19/70* (2014.11)

(58) Field of Classification Search
None
See application file for complete search history.

(56) References Cited

U.S. PATENT DOCUMENTS

| 2014/0362925 A1* | 12/2014 | Nguyen | H04N 19/91 |
| | | | 375/240.18 |
| 2017/0064336 A1* | 3/2017 | Zhang | H04N 19/593 |
| 2020/0177882 A1* | 6/2020 | Yoo | H04N 19/60 |

(Continued)

OTHER PUBLICATIONS

International Search Report and Written Opinion—PCT/US2021/062742—ISA/EPO—dated Apr. 7, 2022.

(Continued)

*Primary Examiner* — Chikaodili E Anyikire
(74) *Attorney, Agent, or Firm* — Polsinelli LLP

(57) ABSTRACT

Techniques are described herein for processing video data using a history-based rice parameter derivation. For instance, a process can include obtaining a transform block including a plurality of samples. One or more parameters (e.g., rice parameters) can be determined for the plurality of samples by analyzing a local neighborhood of a current sample of the plurality of samples and determining that a number of neighboring transform coefficients of the current sample is less than a threshold amount. A historic parameter value (e.g., a historic rice parameter value) determined from one or more previously decoded transform blocks can be obtained and, based at least in part on the historic parameter value, a parameter (e.g., a rice parameter) can be determined for the current sample. The current sample can be decoded based on the determined parameter for the current sample.

34 Claims, 9 Drawing Sheets

(51) Int. Cl.
  *H04N 19/18* (2014.01)
  *H04N 19/105* (2014.01)

(56) References Cited

U.S. PATENT DOCUMENTS

2020/0260080 A1* 8/2020 Choi ................ H03M 7/4075
2023/0044030 A1* 2/2023 Nguyen ................ H04N 19/13

OTHER PUBLICATIONS

Rusanovskyy (Qualcomm), D., et al., "CE-1.1 and CE-1.2: On the Rice Parameter Derivation for High Bit-Depth Coding", 21, JVET Meeting, Jan. 6, 2021-Jan. 15, 2021, Teleconference, (The Joint Video Exploration Team of ISO/IEC JTC1/SC29/WG11 and ITU-TSG.16), No. JVET-U0064, Jan. 1, 2021 (Jan. 1, 2021), XP030293128, 12 Pages, Retrieved from the Internet: URL: https://jvet-experts.org/doc_end_user/documents/21_Teleconference/wg11/JVET-U0064-v2.zip JVET-U0064.docx [retrieved on Jan. 1, 2021] p. 1, Paragraph 1- p. 3, Paragraph 2, Figure 1.

Rusanovskyy (Qualcomm) D., et al., "CE-3.5 and CE-3.6: Combination of CE-1.2, CE-1. 4/1.5 and CE-1.3", 133. MPEG Meeting, Jan. 11, 2021-Jan. 15, 2021, Online, (Motion Picture Expert Group ORISO/IEC JTC1/SC29/WG11), No. m55843, Dec. 30, 2020 (Dec. 30, 2020), XP030290560, 9 Pages, Retrieved from the Internet: URL: https://dms.mpeg.expert/doc_end_user/documents/133_Teleconference/wg11/m55843-JVET-00066-v1-JVET-00066_CE3.5-3.6.ZIP JVET-U0066.docx [retrieved on Dec. 30, 2020] p. 1, paragraph 1-p. 3, paragraph 2, figure 2, table 9.3.3.2.

* cited by examiner

600

OBTAIN A TRANSFORM BLOCK, THE TRANSFORM BLOCK INCLUDING A PLURALITY OF SAMPLES
602

↓

DETERMINE ONE OR MORE RICE PARAMETERS FOR THE PLURALITY OF SAMPLES AT LEAST IN PART BY ANALYZING A LOCAL NEIGHBORHOOD OF A CURRENT SAMPLE OF THE PLURALITY OF SAMPLES
604

↓

DETERMINE, BASED AT LEAST IN PART ON THE ANALYSIS OF THE LOCAL NEIGHBORHOOD, THAT A NUMBER OF NEIGHBORING TRANSFORM COEFFICIENTS OF THE CURRENT SAMPLE IS LESS THAN A THRESHOLD AMOUNT
606

↓

OBTAIN A HISTORIC PARAMETER VALUE DETERMINED FROM ONE OR MORE PREVIOUSLY DECODED TRANSFORM BLOCKS
608

↓

BASED AT LEAST IN PART ON THE HISTORIC PARAMETER VALUE, DETERMINE A PARAMETER FOR THE CURRENT SAMPLE
610

↓

DECODE THE CURRENT SAMPLE BASED ON THE DETERMINED PARAMETER FOR THE CURRENT SAMPLE
612

FIG. 6

LOW COMPLEXITY HISTORY USAGE FOR RICE PARAMETER DERIVATION FOR HIGH BIT-DEPTH VIDEO CODING

CROSS-REFERENCE TO RELATED APPLICATIONS

This application claims the benefit of U.S. Provisional Application No. 63/124,013, filed Dec. 10, 2020, which is hereby incorporated by reference, in its entirety and for all purposes.

FIELD

This application is related to video coding (e.g., video encoding and/or video decoding). For example, aspects of the application relate to systems and techniques for improving parameter derivation (e.g., rice parameter derivation) for regular residual coding (RRC) in high bit-depth coding. The systems and techniques are applicable to the new extension of the Versatile Video Coding (VVC) standard, among other standards and extensions thereof.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), MPEG-2 Part 2 coding (MPEG stands for moving picture experts group), among others, among others, as well as proprietary video codecs/formats such as AOMedia Video 1 (AV1) developed by the Alliance for Open Media. Video coding generally utilizes prediction methods (e.g., inter-prediction, intra-prediction, or the like) that take advantage of redundancy present in video images or sequences. A goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some examples, systems and techniques are described for parameter derivation (e.g., rice parameter derivation) based at least in part on historic parameter information (e.g., historic rice parameter information). According to at least one illustrative example, a method of decoding video data is provided. The method includes: obtaining a transform block, the transform block including a plurality of samples; determining one or more parameters for the plurality of samples at least in part by analyzing a local neighborhood of a current sample of the plurality of samples; determining, based at least in part on the analysis of the local neighborhood, that a number of neighboring transform coefficients of the current sample is less than a threshold amount; obtaining a historic parameter value determined from one or more previously decoded transform blocks; based at least in part on the historic parameter value, determining a parameter for the current sample; and decoding the current sample based on the determined parameter for the current sample.

In another example, an apparatus for decoding video data is provided that includes a memory and one or more processor (e.g., implemented in circuitry) coupled to the memory. The one or more processors are configured to and can: obtain a transform block, the transform block including a plurality of samples; determine one or more parameters for the plurality of samples at least in part by analyzing a local neighborhood of a current sample of the plurality of samples; determine, based at least in part on the analysis of the local neighborhood, that a number of neighboring transform coefficients of the current sample is less than a threshold amount; obtain a historic parameter value determined from one or more previously decoded transform blocks; based at least in part on the historic parameter value, determine a parameter for the current sample; and decode the current sample based on the determined parameter for the current sample.

In another example, a non-transitory computer-readable medium is provided that has stored thereon instructions that, when executed by one or more processors, cause the one or more processors to: obtain a transform block, the transform block including a plurality of samples; determine one or more parameters for the plurality of samples at least in part by analyzing a local neighborhood of a current sample of the plurality of samples; determine, based at least in part on the analysis of the local neighborhood, that a number of neighboring transform coefficients of the current sample is less than a threshold amount; obtain a historic parameter value determined from one or more previously decoded transform blocks; based at least in part on the historic parameter value, determine a parameter for the current sample; and decode the current sample based on the determined parameter for the current sample.

In another example, an apparatus is provided that includes: means for obtaining a transform block, the transform block including a plurality of samples; means for determining one or more parameters for the plurality of samples at least in part by analyzing a local neighborhood of a current sample of the plurality of samples; means for determining, based at least in part on the analysis of the local neighborhood, that a number of neighboring transform coefficients of the current sample is less than a threshold amount; means for obtaining a historic parameter value determined from one or more previously decoded transform blocks; means for, based at least in part on the historic parameter value, determining a parameter for the current sample; and means for decoding the current sample based on the determined parameter for the current sample.

In another example, a method of encoding video data is provided that includes: obtaining a transform block, the transform block including a plurality of samples; determining one or more parameters for the plurality of samples at least in part by analyzing a local neighborhood of a current sample of the plurality of samples; determining, based at least in part on the analysis of the local neighborhood, that a number of neighboring transform coefficients of the current sample is less than a threshold amount; obtaining a historic parameter value determined from one or more previously encoded transform blocks; based at least in part on the historic parameter value, determining a parameter for the current sample; and generating a bitstream based on the determined parameter for the current sample.

In another example, an apparatus for encoding video data is provided that includes a memory and one or more processor (e.g., implemented in circuitry) coupled to the memory. The one or more processors are configured to and can: obtain a transform block, the transform block including a plurality of samples; determine one or more parameters for the plurality of samples at least in part by analyzing a local neighborhood of a current sample of the plurality of samples; determine, based at least in part on the analysis of the local neighborhood, that a number of neighboring transform coefficients of the current sample is less than a threshold amount; obtain a historic parameter value determined from one or more previously encoded transform blocks; based at least in part on the historic parameter value, determine a parameter for the current sample; and generate a bitstream based on the determined parameter for the current sample.

In another example, a non-transitory computer-readable medium is provided that has stored thereon instructions that, when executed by one or more processors, cause the one or more processors to: obtain a transform block, the transform block including a plurality of samples; determine one or more parameters for the plurality of samples at least in part by analyzing a local neighborhood of a current sample of the plurality of samples; determine, based at least in part on the analysis of the local neighborhood, that a number of neighboring transform coefficients of the current sample is less than a threshold amount; obtain a historic parameter value determined from one or more previously decoded transform blocks; based at least in part on the historic parameter value, determine a parameter for the current sample; and generate a bitstream based on the determined parameter for the current sample.

In another example, an apparatus is provided that includes: means for obtaining a transform block, the transform block including a plurality of samples; means for determining one or more parameters for the plurality of samples at least in part by analyzing a local neighborhood of a current sample of the plurality of samples; means for determining, based at least in part on the analysis of the local neighborhood, that a number of neighboring transform coefficients of the current sample is less than a threshold amount; means for obtaining a historic parameter value determined from one or more previously encoded transform blocks; based at least in part on the historic parameter value, means for determining a parameter for the current sample; and means for generating a bitstream based on the determined parameter for the current sample.

In some aspects, the one or more parameters for the plurality of samples include one or more rice parameters, the historic parameter value is a historic rice parameter value, and the parameter determined for the current sample is a rice parameter for the current sample. In some aspects, the existing historic parameter value is an existing historic rice parameter value.

In some aspects, the methods, apparatuses, and computer-readable media described above further comprise: based at least in part on a determination that the number of neighboring transform coefficients is zero, determining the parameter for the current sample based on a first integer multiple of the historic parameter value.

In some aspects, determining the parameter for the current sample comprises providing, as input to a look-up table that maps between inputs and parameters, the first integer multiple of the historic parameter value.

In some aspects, the first integer multiple and the threshold amount are a same value.

In some aspects, the methods, apparatuses, and computer-readable media described above further comprise: based at least in part on a determination that the number of neighboring transform coefficients is greater than zero, determining the parameter for the current sample based on a second integer multiple of the historic parameter value and a sum of the neighboring transform coefficients.

In some aspects, determining the parameter for the current sample comprises providing, as input to a look-up table that maps between inputs and parameters, the second integer multiple of the historic parameter value summed with the sum of the neighboring transform coefficients.

In some aspects, the second integer multiple is less than the first integer multiple.

In some aspects, determining that the number of neighboring transform coefficients is less than the threshold amount is based at least in part on identifying one or more unavailable neighboring transform coefficients for the current sample.

In some aspects, the methods, apparatuses, and computer-readable media described above further comprise: obtaining a location of the current sample within the transform block; comparing the location of the current sample to one or more of a width of the transform block and a height of the transform block; and based at least in part on the comparison, identifying the one or more unavailable neighboring transform coefficients.

In some aspects, the one or more unavailable neighboring transform coefficients are associated with a location outside of the transform block.

In some aspects, determining that the number of neighboring transform coefficients is less than the threshold amount comprises: determining that a horizontal component of the location of the current sample is within a first distance of the width of the transform block; and determining that a vertical component of the location of the current sample is within a second distance of the height of the transform block.

In some aspects, the plurality of samples is associated with a transform block sample type, the transform block sample type including luma samples or chroma samples.

In some aspects, the transform block sample type is the same as a sample type associated with the one or more previously decoded transform blocks from which the historic parameter value is determined.

In some aspects, the historic parameter value is determined based at least in part on a first non-zero decoded transform coefficient obtained from each of the one or more previously decoded transform blocks.

In some aspects, the methods, apparatuses, and computer-readable media described above further comprise determining a binary codelength for each first non-zero decoded transform coefficient obtained from each of the one or more previously decoded transform blocks.

In some aspects, the historic parameter value is determined as an exponential weighted moving average of the binary codelength determined for the first non-zero decoded transform coefficient of each of the one or more previously decoded transform blocks.

In some aspects, decoding the current sample based on the determined parameter for the current sample comprises decoding a syntax element indicative of the current sample based on the determined parameter.

In some aspects, decoding the current sample based on the determined parameter comprises decoding a Golomb-Rice code using the determined parameter.

In another example, a method of decoding video data is provided that includes: obtaining a transform block; determining one or more non-zero decoded transform coefficients at least in part based on an analysis of the transform block; determining, based on at least a portion of the one or more non-zero decoded transform coefficients, a history update value for the transform block; updating an existing historic parameter value at least in part by combining the history update value for the transform block with the existing historic parameter value, the existing historic parameter value based at least in part on a series of non-zero decoded transform coefficients determined from a series of previously analyzed transform blocks; and decoding at least one sample of the transform block based on the existing historic parameter value or the updated existing historic parameter value.

In another example, an apparatus for decoding video data is provided that includes a memory and one or more processor (e.g., implemented in circuitry) coupled to the memory. The one or more processors are configured to and can: obtain a transform block; determine one or more non-zero decoded transform coefficients at least in part based on an analysis of the transform block; determine, based on at least a portion of the one or more non-zero decoded transform coefficients, a history update value for the transform block; update an existing historic parameter value at least in part by combining the history update value for the transform block with the existing historic parameter value, the existing historic parameter value based at least in part on a series of non-zero decoded transform coefficients determined from a series of previously analyzed transform blocks; and decode at least one sample of the transform block based on the existing historic parameter value or the updated existing historic parameter value.

In another example, a non-transitory computer-readable medium is provided that has stored thereon instructions that, when executed by one or more processors, cause the one or more processors to: obtain a transform block; determine one or more non-zero decoded transform coefficients at least in part based on an analysis of the transform block; determine, based on at least a portion of the one or more non-zero decoded transform coefficients, a history update value for the transform block; update an existing historic parameter value at least in part by combining the history update value for the transform block with the existing historic parameter value, the existing historic parameter value based at least in part on a series of non-zero decoded transform coefficients determined from a series of previously analyzed transform blocks; and decoding at least one sample of the transform block based on the existing historic parameter value or the updated existing historic parameter value.

In another example, an apparatus is provided that includes: means for obtaining a transform block; means for determining one or more non-zero decoded transform coefficients at least in part based on an analysis of the transform block; means for determining, based on at least a portion of the one or more non-zero decoded transform coefficients, a history update value for the transform block; means for updating an existing historic parameter value at least in part by combining the history update value for the transform block with the existing historic parameter value, the existing historic parameter value based at least in part on a series of non-zero decoded transform coefficients determined from a series of previously analyzed transform blocks; and means for decoding at least one sample of the transform block based on the existing historic parameter value or the updated existing historic parameter value.

In another example, a method of encoding video data is provided that includes: obtaining a transform block; determining one or more non-zero coded transform coefficients at least in part based on an analysis of the transform block; determining, based on at least a portion of the one or more non-zero coded transform coefficients, a history update value for the transform block; updating an existing historic parameter value at least in part by combining the history update value for the transform block with the existing historic parameter value, the existing historic parameter value based at least in part on a series of non-zero coded transform coefficients determined from a series of previously analyzed transform blocks; and generating a bitstream based on the existing historic parameter value or the updated existing historic parameter value.

In another example, an apparatus for encoding video data is provided that includes a memory and one or more processor (e.g., implemented in circuitry) coupled to the memory. The one or more processors are configured to and can: obtain a transform block; determine one or more non-zero coded transform coefficients at least in part based on an analysis of the transform block; determine, based on at least a portion of the one or more non-zero coded transform coefficients, a history update value for the transform block; update an existing historic parameter value at least in part by combining the history update value for the transform block with the existing historic parameter value, the existing historic parameter value based at least in part on a series of non-zero coded transform coefficients determined from a series of previously analyzed transform blocks; and generate a bitstream based on the existing historic parameter value or the updated existing historic parameter value.

In another example, a non-transitory computer-readable medium is provided that has stored thereon instructions that, when executed by one or more processors, cause the one or more processors to: obtain a transform block; determine one or more non-zero decoded transform coefficients at least in part based on an analysis of the transform block; determine, based on at least a portion of the one or more non-zero decoded transform coefficients, a history update value for the transform block; update an existing historic parameter value at least in part by combining the history update value for the transform block with the existing historic parameter value, the existing historic parameter value based at least in part on a series of non-zero decoded transform coefficients determined from a series of previously analyzed transform blocks; and generate a bitstream based on the existing historic parameter value or the updated existing historic parameter value.

In another example, an apparatus is provided that includes: means for obtaining a transform block; means for determining one or more non-zero coded transform coefficients at least in part based on an analysis of the transform block; means for determining, based on at least a portion of the one or more non-zero coded transform coefficients, a history update value for the transform block; means for updating an existing historic parameter value at least in part by combining the history update value for the transform block with the existing historic parameter value, the existing historic parameter value based at least in part on a series of non-zero coded transform coefficients determined from a series of previously analyzed transform blocks; and means for generating a bitstream based on the existing historic parameter value or the updated existing historic parameter value.

In some aspects, combining the history update value for the transform block with the existing historic parameter value comprises averaging the history update value for the transform block with the existing historic parameter value.

In some aspects, combining the history update value for the transform block with the existing historic parameter value comprises determining an exponential weighted moving average between the history update value for the transform block and the existing historic parameter value.

In some aspects, the methods, apparatuses, and computer-readable media described above further comprise assigning a first weight to the history update value for the transform block and a second weight to the existing historic parameter value, wherein determining the exponential weighted moving average is based at least in part on the first weight and the second weight.

In some aspects, the history update value for the transform block is determined based on a first non-zero decoded transform coefficient determined in the analysis of the transform block.

In some aspects, the first non-zero decoded transform coefficient is determined based on a run scan order of the transform block in inverse direction.

In some aspects, the history update value for the transform block is determined at least in part by determining a binary codelength of the first non-zero decoded transform coefficient.

In some aspects, the transform block and the previously analyzed transform blocks are associated with a first slice; and the existing historic parameter value is iteratively updated based on successive history update values determined for successively analyzed transform blocks associated with a same slice.

In some aspects, the methods, apparatuses, and computer-readable media described above further comprise initializing the existing historic parameter value to a pre-determined value, wherein the initializing is performed prior to analyzing a first transform block of the first slice and determining a history update value for the first transform block.

In some aspects, the history update value for the transform block is determined based on all of the non-zero decoded transform coefficients of the transform block.

In some aspects, the history update value is determined at least in part by averaging all of the non-zero decoded transform coefficients of the transform block.

In some aspects, decoding the at least one sample of the transform block comprises decoding a syntax element indicative of the at least one sample based on the existing historic parameter value or the updated existing historic parameter value.

In some aspects, decoding the at least one sample of the transform block comprises decoding a Golomb-Rice code using the existing historic parameter value or the updated existing historic parameter value.

In some aspects, an apparatus can be or can be part of a mobile device (e.g., a mobile telephone or so-called "smartphone," or other mobile device), a personal computer, a laptop computer, an extended reality (XR) device (e.g., a virtual reality (VR) device, an augmented reality (AR) device, or a mixed reality (MR) device), an Internet-of-Things (IoT) device, a vehicle or a computing component or system of a vehicle, a smart wearable device, a server computer, a camera (e.g., a digital camera, an Internet Protocol (IP) camera, etc.), a multi-camera system, a robotics device or system, an aviation device or system, or other device. In some aspects, the apparatus includes a camera or multiple cameras for capturing one or more images. In some aspects, the apparatus includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 6 is a flow chart illustrating an example of a process for deriving rice parameters, in accordance with some examples;

DETAILED DESCRIPTION

Figure 1:
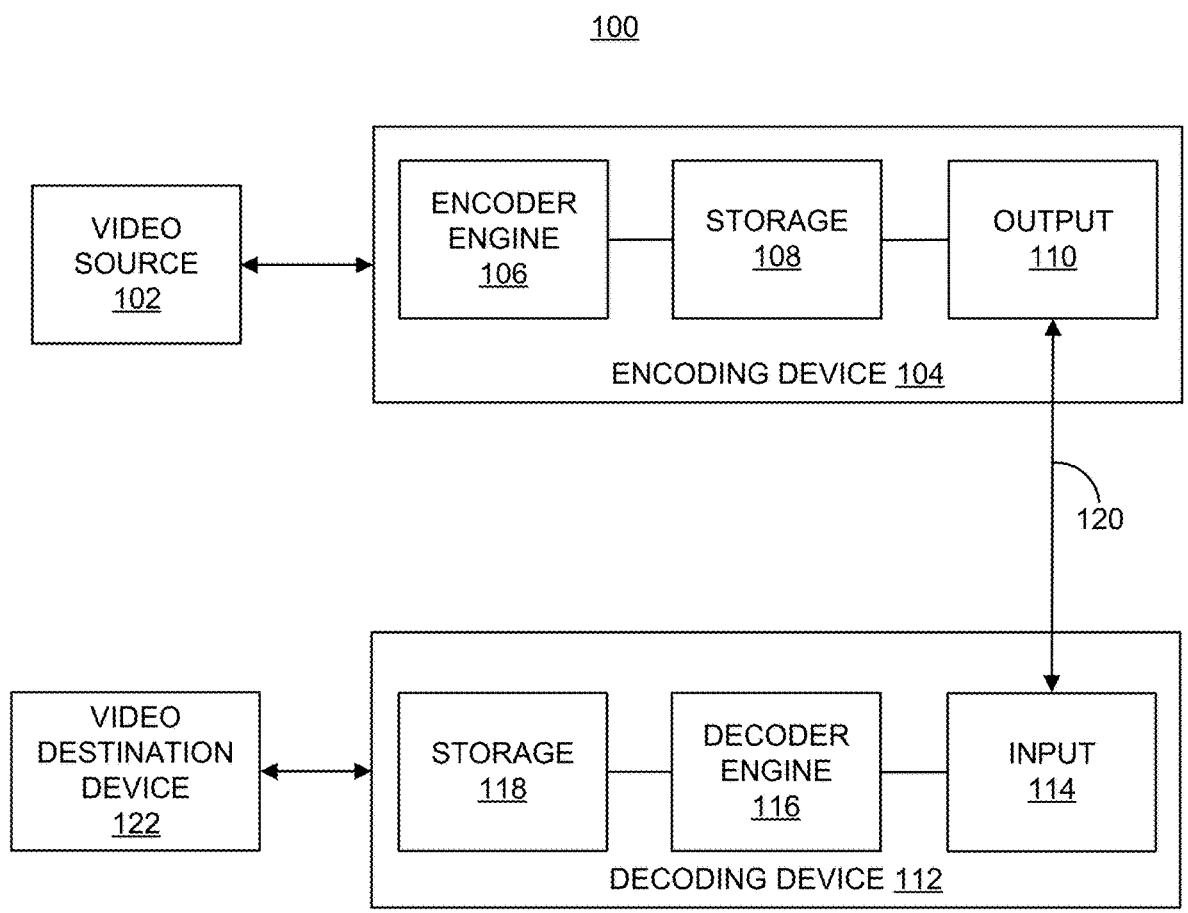
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy encode the quantized transform coefficients and/or the syntax elements, thereby further reducing the number of bits needed for their representation.

After entropy decoding and de-quantizing the received bitstream, a video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Video coding can be performed according to a particular video coding standard. Examples of video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual, Advanced Video Coding (AVC) or ITU-T H.264, including its Scalable Video Coding (SVC) and Multiview Video Coding (MVC) extensions, High Efficiency Video Coding (HEVC) or ITU-T H.265, including its range and screen content coding, 3D video coding (3D-HEVC), multiview (MV-HEVC), and scalable (SHVC) extensions, Versatile Video Coding (VVC) or ITU-T H.266 and its extensions, VP9, Alliance of Open Media (AOMedia) Video 1 (AV1), Essential Video Coding (EVC), among others.

As noted above, a video encoder may entropy encode quantized transform coefficients and/or syntax elements to generate a bitstream. A video decoder can entropy decode the bitstream using an inverse entropy coding process. In some examples, rice coding using rice parameters can be used for performing entropy coding (e.g., entropy encoding and/or decoding). In the current VVC standard, a rice parameter for regular residual coding (RRC) can be derived based on a template (also referred to as a rice parameter derivation template) for determining (e.g., calculating, computing, etc.) sums of neighboring transform coefficients and a lookup table that maps different possible sum values to specific rice parameter values. In this approach, the determined sum from the rice parameter derivation template is used as an index into the lookup table of rice parameter values. In one illustrative example, the rice parameter derivation template can be applied over a grid of samples (e.g., a grid of 8×8 samples). In some cases, the grid can represent a transform block (TB) or a transform unit (TU) obtained from a larger frame or slice of video data. To determine a rice parameter for a current transform coefficient, the video encoder or decoder can utilize the template to identify one or more neighboring transform coefficients. The rice parameter derivation template can be used to identify a number of neighboring coefficients (e.g., five neighboring coefficients) for a given current coefficient. The video encoder or decoder can then determine a sum of the absolute values of the neighboring transform coefficients identified based on the template.

The template-based method for rice parameter derivation (e.g., the template-based rice parameter derivation according to VVC Section 9.3.3.2 (e.g., the un-modified Eq. 1517) and various modification examples described below (e.g., modifications of Eq. 1517) can, in some examples, make use of the fact that decoding is conducted in an inverse pass, starting from the end of the block and progressing toward its DC. Based on the inverse pass decoding performed for each block (e.g., TU or TB), such rice parameter derivation techniques can utilize one or more transform coefficients that were decoded earlier in the current TU.

In some cases (e.g., in the case of High Bit Depth coding), for a high percentage of small size TUs or TBs (e.g., having a size of 4×4) with transform coefficients coded using a Golomb-Rice method, accurate rice derivation cannot be made for certain transform coefficients, such as the transform coefficients that appear at the very beginning of the TU decoding. For instance, there may be an insufficient quantity of non-zero neighboring transform coefficients available to perform the template-based rice parameter derivation for those coefficients appearing at the beginning of TU decoding (e.g., based on the template-based rice parameter derivation using some predetermined number of neighboring transform coefficients, such as five).

As described in more detail herein, systems, apparatuses, methods, and computer-readable media (collectively referred to as "systems and techniques") are described herein for improving parameter derivation (e.g., rice parameter derivation). Such systems and techniques can be used for regular residual coding (RRC) in high bit-depth coding and/or for other video coding. According to some aspects, the systems and techniques can include performing rice parameter derivation in the presence of one or more unavailable neighboring transform coefficients. For example, a video encoder and/or video decoder can be determined that, for a current sample of a current TU (e.g., a currently decoded sample of a currently decoded TU in the case of a decoder), one or more neighboring transform coefficients specified by a rice derivation template are unavailable. An unavailable neighboring transform coefficient can be a transform coefficient that is not located within the same TU as the currently decoded coefficient. For example, an unavailable neighboring transform coefficient can be determined to be present when the rice derivation template spans one or more borders or edges of the currently decoded TU.

Rather than ignoring unavailable neighboring transform coefficients, or setting them equal to zero, the systems and techniques described herein can provide a historical rice parameter value that is used in place of the unavailable neighboring transform coefficient when performing the template and lookup table-based rice derivation. In some examples, the historical rice parameter value can be determined (e.g., calculated, computed, etc.) by maintaining one or more history counters that accumulate one or more first decoded non-zero transform coefficients obtained from previously decoded TUs. For example, the previously decoded TUs and the currently decoded TU can be associated with the same frame, block, slice, or other partition of video data and the history counter(s) maintained for the duration of the larger unit to which the currently decoded TU belongs. The history counter(s) can maintain a running sum of the first non-zero decoded transform coefficient from the earlier TUs, from which an arithmetic average can be determined each time the historical rice parameter value is queried or used to perform rice derivation according to the systems and techniques described herein. In some examples, one or more history counters can implement a weighted average or an exponential weighted moving average for the historical rice parameter value, as will be described in greater depth below.

Further details regarding the systems and techniques will be described with respect to the figures.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, the system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The systems and techniques described herein can be applied to any of the existing video codecs (e.g., VVC, HEVC, AVC, or other suitable existing video codec), and/or can be an efficient coding tool for any video coding standards being developed and/or future video coding standards. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and the decoder engine 116 (described in more detail below) may be configured to operate according to VVC. According to VVC, a video coder (such as the encoder engine 106 and/or the decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enables parallel processing and/or multi-threading for encoder and decoder implementations.

In some examples, the encoding device 104 and decoding device 112 can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The encoding device 104 and decoding device 112 can be configured to use quadtree partitioning per HEVC, QTBT partitioning, MTT partitioning, or other partitioning structures.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 3

Specification of intra-prediction mode and associated names

| Intra-prediction mode | Associated name |
|---|---|
| 0 | INTRA_PLANAR |
| 1 | INTRA_DC |
| 2..34 | INTRA_ANGULAR2..INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communication link 120 to the decoding device 112 of the receiving device. The input 114 of the decoding device 112 may receive the NAL units. The communication link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in a storage 108. The output 110 may retrieve the encoded video bitstream data from the encoder engine 106 or from the storage 108. The storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection, and may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to the storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 8. An example of specific details of the decoding device 112 is described below with reference to FIG. 9.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. In some examples, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

Figure 2:
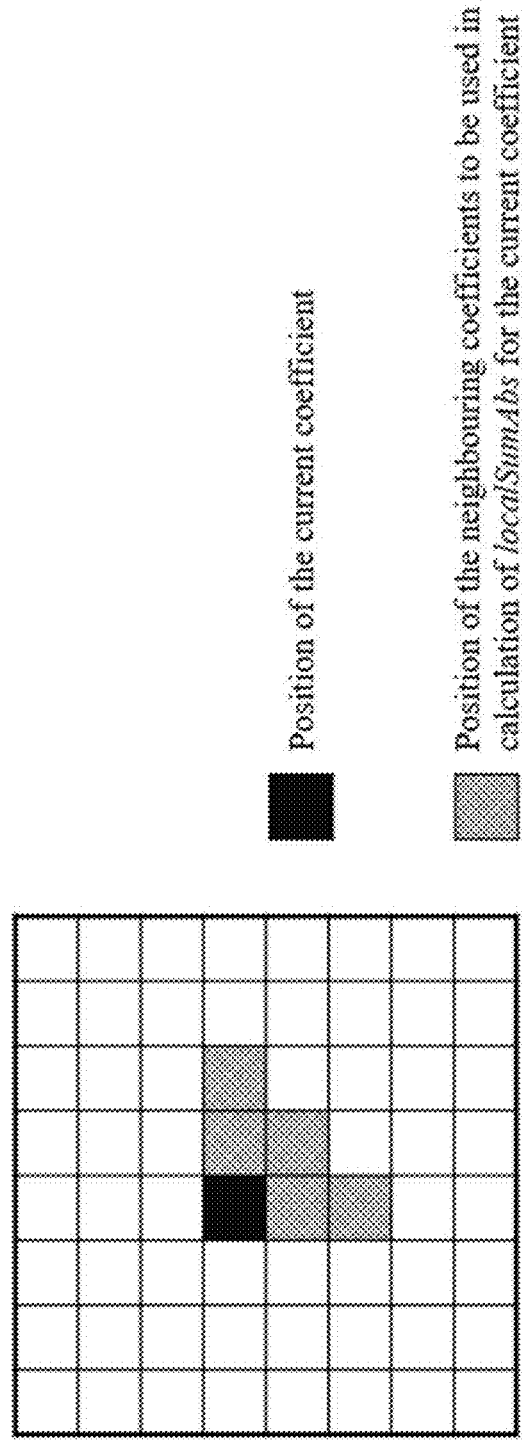
FIG. 2 is a diagram illustrating an example of a rice derivation template indicating neighboring coefficients of a current coefficient, in accordance with some examples.

As noted above, the encoding device 104 may entropy encode quantized transform coefficients and/or syntax elements to generate a bitstream. The decoding device 112 can receive and entropy decode the bitstream. In some examples, the encoding device 104 and/or the decoding device 112 can utilize rice coding using rice parameters for performing entropy coding (e.g., entropy encoding and/or decoding). According to the current VVC standard, a rice parameter for regular residual coding (RRC) can be derived based on a template for calculating sums of neighboring transform coefficients and a lookup table that maps different possible sum values to specific rice parameter values. In this approach, the calculated sum from the template is used as an index into the lookup table of rice parameter values. An example template is illustrated in FIG. 2, described below. An example of a lookup table of rice parameter values is provided in Table 1, below.

FIG. 2 is a diagram illustrating an example of a template for rice parameter derivation. In the example of FIG. 2, the template is shown as being applied over an 8×8 grid of samples, although a greater or lesser number of samples (and a larger or smaller grid) can also be utilized. In some cases, the 8×8 grid can represent a transform block or a transform unit (TU) obtained from a larger frame or slice of video data. As illustrated, to determine the rice parameter for a current transform coefficient (e.g., shaded with a solid black fill), a video coder can first utilize the template to identify one or more neighboring transform coefficients (e.g., lightly shaded with a diagonal fill). As illustrated in FIG. 2, the rice parameter derivation template identifies five neighboring coefficients for a given current coefficient, although a greater or lesser number of neighboring coefficients and/or different patterns and arrangements of neighboring coefficients can also be utilized.

The video coder can subsequently determine a sum of the absolute values of the neighboring transform coefficients identified based on the template (e.g., locSumAbs). In some examples, the resulting sum of the neighboring transform coefficients can be provided directly as an index into the lookup table of Table 1 in order to thereby obtain the rice parameter value for the current coefficient. In one example, locSumAbs can be normalized (e.g., via subtraction and clip operations) prior to being provided as an index into Table 1, as follows:

$$locSumAbs = Clip3(0, 31, locSumAbs - baseLevel*5).$$

As mentioned previously, the rice parameter can be derived using the value of locSumAbs as an index into a lookup table. An example of a lookup table mapping between locSumAbs values and rice parameter values (e.g., cRiceParam) is provided in Table 1 below:

TABLE 1

Example rice parameter lookup table indexed on locSumAbs values.

| | locSumAbs | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| cRiceParam | 0 | 0 | 0 | 0 | 0 | 0 | 0 | 1 | 1 | 1 | 1 | 1 | 1 | 1 | 2 | 2 |
| | locSumAbs | | | | | | | | | | | | | | | |
| | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

As depicted in Table 1, in some examples the range of values for the rice parameter can be constrained from 0 to 3, inclusive. Because the raw locSumAbs values are normalized (e.g., via the example normalization operation provided above) to be between 0 and 31, Table 1 can be used to derive a rice parameter value for all possible values of locSumAbs that may be output by the normalization operation.

The rice parameter derivation process given by section 9.3.3.2 of the VVC specification is reproduced below for reference:

---

9.3.3.2 Rice parameter derivation process for abs_remainder[ ] and dec_abs_level[ ]

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.

Output of this process is the Rice parameter cRiceParam.

Given the array AbsLevel[ x ][ y ] for the transform block with component index cIdx and the top-left luma location ( x0, y0 ), the variable locSumAbs is derived as specified by the following pseudo-code process:

```
locSumAbs = 0
if( xC < ( 1 << log2TbWidth ) - 1 ) {
    locSumAbs += AbsLevel[ xC + 1 ][ yC ]
    if( xC < ( 1 << log2TbWidth ) - 2 )
        locSumAbs += AbsLevel[ xC + 2 ][ yC ]
    if( yC < ( 1 << log2TbHeight ) - 1 )
        locSumAbs += AbsLevel[ xC + 1 ][ yC + 1 ]                (1517)
}
if( yC < ( 1 << log2TbHeight ) - 1 ) {
    locSumAbs += AbsLevel[ xC ][ yC + 1 ]
    if( yC < ( 1 << log2TbHeight ) - 2 )
        locSumAbs += AbsLevel[ xC ][ yC + 2 ]
}
locSumAbs = Clip3( 0, 31, locSumAbs - baseLevel * 5 )
```

Given the variable locSumAbs, the Rice parameter cRiceParam is derived as specified in Table 128.

When baseLevel is equal to 0, the variable ZeroPos[ n ] is derived as follows:

$$ZeroPos[\,n\,] = (\,QState < 2\,?\,1\,:\,2\,) \ll cRiceParam \qquad (1518)$$

---

TABLE 128

Specification of cRiceParam based on locSumAbs

| | locSumAbs | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| cRiceParam | 0 | 0 | 0 | 0 | 0 | 0 | 0 | 1 | 1 | 1 | 1 | 1 | 1 | 1 | 2 | 2 |

| | locSumAbs | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

In some cases, the rice parameter derivation of VVC 9.3.3.2 can be modified, e.g., for the High Bit Depth extension of VVC, based on an observation that high bit-depth video data may otherwise experience performance and/or efficiency limitations under the un-modified rice parameter derivation process of VVC 9.3.3.2. A modified rice parameter derivation can therefore be used to address one or more of these limitations in various input bit-depths of video and can thus improve compression efficiency of the coding design. For instance, in some examples a modified rice parameter derivation can include scaling or normalizing locSumAbs to handle an increased bit-depth and/or an increased dynamic range of transform coefficients. Similar to as was described previously, the scaling and normalization can be performed prior to using locSumAbs to derive a rice parameter. In some examples, a modified Eq. 1517 of the VVC specification can be used.

A first example of a modified Eq. 1517 for rice parameter derivation is provided below, annotated to indicate the modifications relative to VVC 9.3.3.2. The amount of scaling factor applied may be dependent on the input bit-depth, a predefined operational bit-depth (e.g., 10), a local activity of transform coefficients, and/or a block size or syntax element signaled in the bitstream. Then locSumAbs may be clipped to a certain range, e.g., using the existing clipping mechanism in VVC that clips locSumAbs to be between 0 and 31. The normalized and clipped locSumAbs may subsequently be used to derive a rice parameter value using a predefined lookup table, e.g., the current lookup table in VVC, Table 128 (which is the same as Table 1 above). The rice parameter value from the lookup table can then be modified by adding an offset to extend the dynamic range of the rice parameter range. The following is an example modification of Section 9.3.3.2 of the VVC specification using the example technique(s) described above (with additions being shown in underlined text ("_additions_")):

---

9.3.3.2 Rice parameter derivation process for abs_remainder[ ] and dec_abs_level[ ]

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.

Output of this process is the Rice parameter cRiceParam.

Given the array AbsLevel[ x ][ y ] for the transform block with component index cIdx and the top-left luma location ( x0, y0 ), the variable locSumAbs is derived as specified by the following pseudo-code process:

```
locSumAbs = 0
if( xC < ( 1 << log2TbWidth ) - 1 ) {
  locSumAbs += AbsLevel[ xC + 1 ][ yC ]
  if( xC < ( 1 << log2TbWidth ) - 2 )
    locSumAbs += AbsLevel[ xC + 2 ][ yC ]
  if( yC < ( 1 << log2TbHeight ) - 1 )
    locSumAbs += AbsLevel[ xC + 1 ][ yC + 1 ]          (1517)
}
if( yC < ( 1 << log2TbHeight ) - 1 ) {
  locSumAbs += AbsLevel[ xC ][ yC + 1 ]
  if( yC < (1 << log2TbHeight ) - 2 )
    locSumAbs += AbsLevel[ xC ][ yC + 2 ]
}
```

_shift = (Bitdepth - b) > 0 ? Floor(Log2(a*(Bitdepth - b))) : 0_

_locSumAbs = (shift == 0) ? locSumAbs : (locSumAbs + (1 << (shift -1) )) >> shift_ locSumAbs = Clip3( 0, 31, locSumAbs - baseLevel * 5 )

Given the variable locSumAbs, the Rice parameter cRiceParam is derived as specified in Table 128.

cRiceParam is then refined as:

_cRiceParam = cRiceParam + c_

In some examples, the additional variables a, b and c can be defined as follows: the variable a may be an integer value, e.g., a=4 or some other power of 2; the variable b may specify an operational bit-depth, e.g., b=10; and the variable c may be set equal to the computed value shift introduced above in modified Eq. 1517, or derived from the computed shift value.

A second example of a modified Eq. 1517 for rice parameter derivation is provided below, once again annotated to indicate the modifications made relative to VVC 9.3.3.2. In this second example of a modified Eq. 1517, locSumAbs may be scaled and/or normalized only when locSumAbs is larger than or equal to a threshold T. In such examples, the rice parameter derivation process given by VVC 9.3.3.2 can be accordingly modified as follows (with additions being shown in underlined text ("<u>additions</u>")):

---

9.3.3.2 Rice parameter derivation process for abs_remainder[ ] and dec_abs_level[ ]
Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo-code process:

locSumAbs = 0
   if( xC < ( 1 << log2TbWidth ) − 1 ) {
     locSumAbs += AbsLevel[ xC + 1 ][ yC ]
     if( xC < ( 1 << log2TbWidth ) − 2 )
       locSumAbs += AbsLevel[ xC + 2 ][ yC ]
     if( yC < ( 1 << log2TbHeight ) − 1 )
       locSumAbs += AbsLevel[ xC + 1 ][ yC + 1 ]         (1517)
   }
   if( yC < ( 1 << log2TbHeight ) − 1 ) {
     locSumAbs += AbsLevel[ xC ][ yC + 1 ]
     if( yC < ( 1 << log2TbHeight ) − 2 )
       locSumAbs += AbsLevel[ xC ][ yC + 2 ]
   }
   <u>shift = (Bitdepth − b) > 0) && (locSumAbs − baseLevel * 5) >= T ?</u>
   <u>Floor(Log2(a*(Bitdepth − b))) : 0</u>
   <u>locSumAbs = (shift == 0) ? locSumAbs : (locSumAbs + (1 << (shift−1))) >> shift</u>
   locSumAbs = Clip3( 0, 31, locSumAbs − baseLevel * 5 )
Given the variable locSumAbs, the Rice parameter cRiceParam is derived as specified in Table 128.
cRiceParam is then refined as:
   <u>cRiceParam = cRiceParam + c</u>

---

In some examples, the threshold T is a predefined threshold. In one illustrative example, the threshold T may be set equal to 32. In some examples, values of one or more of the variables a, b, and c can be signaled through a bitstream. Additionally, or alternatively, values of one or more of the variables a, b and c can be set dependent on or derived from one or more of: bit-depth, local statistics (e.g., min/max or mean of the transform coefficient values within the current block), decoded transform or block size, and/or syntax elements signaled in the bitstream. In some cases, values of one or more of the variables a, b, and c as used in the second modification of Eq. 1517 immediately above can be the same as or otherwise similar to the corresponding values of one or more of the variables a, b, and c as used in the first modification of Eq. 1517 that was discussed previously.

The template-based method for rice parameter derivation under VVC 9.3.3.2 (e.g., the un-modified Eq. 1517) and the various modification examples described above (e.g., the first and second modifications of Eq. 1517) can, in some examples make use of the fact that decoding is conducted in an inverse pass, starting from the end of the block and progressing toward its DC. Based on the inverse pass decoding performed for each block or TU, these previously described approaches to rice parameter derivation can utilize one or more transform coefficients that were decoded earlier in the current TU.

Certain statistical assumptions were made in VVC development, suggesting that a non-zero transform coefficient (e.g., context coded) could be used to provide accurate rice parameter derivation using the Golomb-Rice method. Further statistical assumptions during VVC development suggested that this non-zero transform coefficient would be available to the decoder before the decoder began transform coefficient decoding. Such an assumption appears to hold for common test conditions (CTC) coding utilized in VVC development.

However, in some cases (e.g., in the case of High Bit Depth coding), it is observed that for a high percentage of small size TUs (e.g., having a size of 4×4) with transform coefficients coded using the Golomb-Rice method, no accurate rice derivation can be made for the transform coefficients that appear at the very beginning of the TU decoding. In particular, there may be an insufficient quantity of non-zero neighboring transform coefficients available to perform the template-based rice parameter derivation for those coefficients appearing at the beginning of TU decoding (recalling that the template-based rice parameter derivation uses some predetermined number of neighboring transform coefficients, such as five).

As described above, systems and techniques are described herein for improving parameter derivation (e.g., rice parameter derivation) in video coding. The systems and techniques can be performed by the encoding device 104, the decoding device 112, by both the encoding device 104 and the decoding device 112, and/or by other devices. In some cases, the encoding device 104 and/or the decoding device 112 can use one or more historic rice parameter values for rice parameter derivation when an insufficient number of neighboring transform coefficients are available. For example, the number of neighboring transform coefficients might be less than a predefined amount needed to fully utilize a template-based lookup table approach to rice parameter derivation (e.g., the approaches used in VVC and/or other video coding standards). Rather than ignoring unavailable neighboring transform coefficients, or setting them equal to zero, the systems and techniques described herein can provide a historical rice parameter value that is used in place of the unavailable neighboring transform coefficient when performing the template and lookup table-based rice derivation. In some examples, the systems and techniques described herein can be used in the context of high bit-depth coding, where shortcomings of existing rice parameter derivation techniques based on lookup tables may be more commonly experienced.

Figure 3:
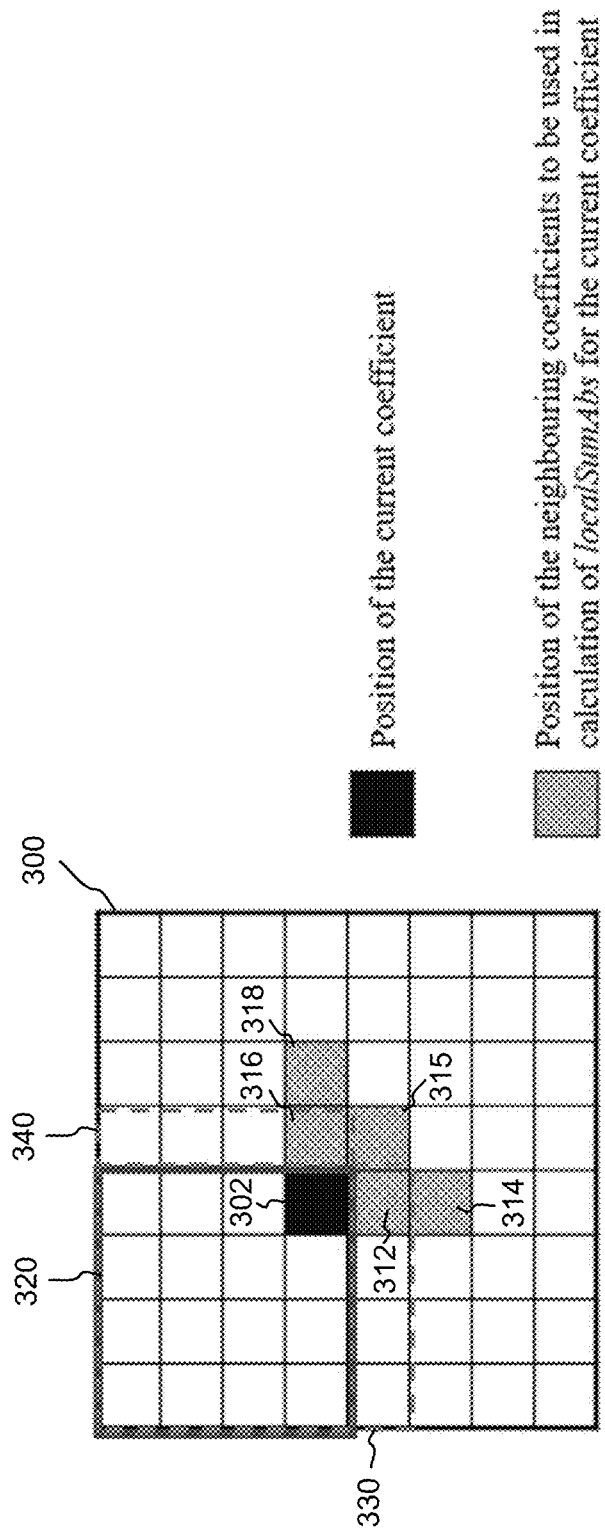
FIG. 3 is a diagram illustrating an example of different transform units (TUs) overlaid with an example rice derivation template, in accordance with some examples.

FIG. 3 is a diagram depicting different example scenarios in which a template support area (e.g., consisting of at least the five neighboring transform coefficients 312, 314, 315, 316, and 318 associated with current coefficient 302) spans outside of a coded transform block or TU and thus results in low accuracy rice parameter derivation. As illustrated in FIG. 3, an 8×8 sample grid 300 is shown overlaid with the boundaries of three different transform blocks 320, 330, and 340 (e.g., TUs). All three of the transform blocks 320, 330, and 340 contain the current coefficient 302, which represents the sample or coefficient for which transform block (e.g., TU) decoding and/or rice parameter derivation is currently being performed. However, the position of current coefficient 302 within the transform blocks 320, 330, and 340 is such that one or more of the five neighboring transform coefficients defined by the rice derivation template are located outside of (e.g., beyond the boundaries of) the transform block (e.g., the TU).

As discussed previously, decoding can be performed in an inverse pass over the constituent samples within a transform block (or TU), such as beginning with bottom-right sample of the transform block. For example, the bottom-right sample of transform block 320 is current coefficient 302; therefore, current coefficient 302 is the first sample decoded for transform block 320. In the case of transform blocks 330 and 340, while current coefficient 302 is not the bottom-right sample, current coefficient 302 remains among the first few samples to be decoded in an inverse pass. In general, it can be observed that the geometry of the rice derivation template may not be fully contained within the boundaries or borders of a transform block (e.g., TU) for samples located near the bottom edge and/or right edge of the transform block. Accordingly, in some cases the first samples to be decoded in an inverse pass are unable to fully utilize the template-based approach to rice parameter derivation that is described above.

In some examples, neighboring transform coefficients that are located outside of the template support area or outside of the current transform block (e.g., the current TU) can be treated as having a value of zero for purposes of determining (e.g., calculating, computing, etc.) the absolute value sum locSumAbs. For example, neighboring transform coefficients 312, 314, 315, and 318 are all located outside of transform block 340 (e.g., TU), with only neighboring transform coefficient 316 located inside of transform block 340. In such an example, proceeding with rice parameter derivation on the basis of only transform coefficient 316 can result in a lower accuracy rice parameter derivation. For some transform blocks (e.g., such as transform block 320), when all of the neighboring transform coefficients defined by the template are located outside of the transform block, it may not be possible to derive a rice parameter using the template and lookup table approach specified in VVC and other video coding standards.

Accordingly, the systems and techniques described herein can be used to improve the accuracy of rice parameter derivation at least in part by determining (e.g., calculating, computing, etc.) and maintaining one or more historic values of optimal rice parameters. In some cases, the historic value(s) of optimal rice parameters can be determined from earlier decoded or encoded transform coefficients (e.g., transform coefficients outside of the current transform block, decoded or encoded at some earlier time in the inverse pass). In some examples, the one or more historic values of optimal rice parameters can be utilized as a historic parameter value determined from one or more previously encoded transform blocks, where the historic parameter value is used to determine a parameter for the current sample (e.g., a rice parameter). In some examples, the historic parameter value can include one or more of a historic rice parameter value and a historic transform coefficient value, where the historic transform coefficient value(s) is determined from one or more previously encoded transform blocks. In some cases, the historic parameter value can be a historic transform coefficient value. In some examples, the historic parameter value can be an offset value, which can be externally derived. When the historic parameter value is an offset value, the offset value can be determined based at least in part on one or more transform coefficient values determined from previously encoded transform blocks, and/or can be a predetermined offset value.

In some examples, one or more historic rice parameter values can be used in determining (e.g., calculating, computing, etc.) the absolute value sum locSumAbs when one or more neighboring transform coefficients given by the rice derivation template are located outside of the current transform block. For instance, rather than treating an unavailable neighboring transform coefficient as having a zero value, the unavailable neighboring transform coefficient can instead be assigned the historic rice parameter value. In the context of FIG. 3 and the example of transform block 340, the unavailable neighboring transform coefficients are 312, 314, 315 and 318. As such, in the example of transform block 340, all four of the unavailable neighboring transform coefficients 312, 314, 315 and 318 can be assigned a historic rice parameter value. In some cases, the same historic rice parameter value can be assigned to all of the unavailable neighboring transform coefficients, although it is also possible for the historic rice parameter value to be modified or adjusted based on information and characteristics specific to each one of the unavailable neighboring transform coefficients.

In some examples, the absolute value sum locSumAbs can be calculated using a combination of the historic rice parameter value and the value(s) of available neighboring transform coefficients. This can be referred to as the partially unavailable case, in which some but not all of the neighboring transform coefficients given by the rice derivation template are located outside of the current transform block (e.g., TU). In the context of transform block 340, the absolute value sum locSumAbs could therefore be calculated as the sum of: the absolute value of available transform coefficient 316 and the four historic rice parameter values obtained or otherwise determined for the four unavailable transform coefficients 312, 314, 315, 318. As mentioned above, the four historic rice parameter values can be the same or can be determined specifically for given ones of the unavailable transform coefficients.

The absolute value sum locSumAbs can additionally, or alternatively, be calculated using only the historic rice parameter value. This can be referred to as the completely unavailable case, in which all of the neighboring transform coefficients given by the rice derivation template are located outside of the current transform block. For example, referring to transform block 320 it can be seen that all five of the neighboring transform coefficients 312, 314, 315, 316, 318 are unavailable with respect to current coefficient 302 of transform block 320. Accordingly, in this completely unavailable case, the absolute value sum locSumAbs could therefore be calculated as the sum of the five historic rice parameter values obtained or otherwise determined for the five unavailable transform coefficients. As mentioned previously, the five historic rice parameter values can be the same or can be determined specifically for given ones of the unavailable transform coefficients.

Figure 4:
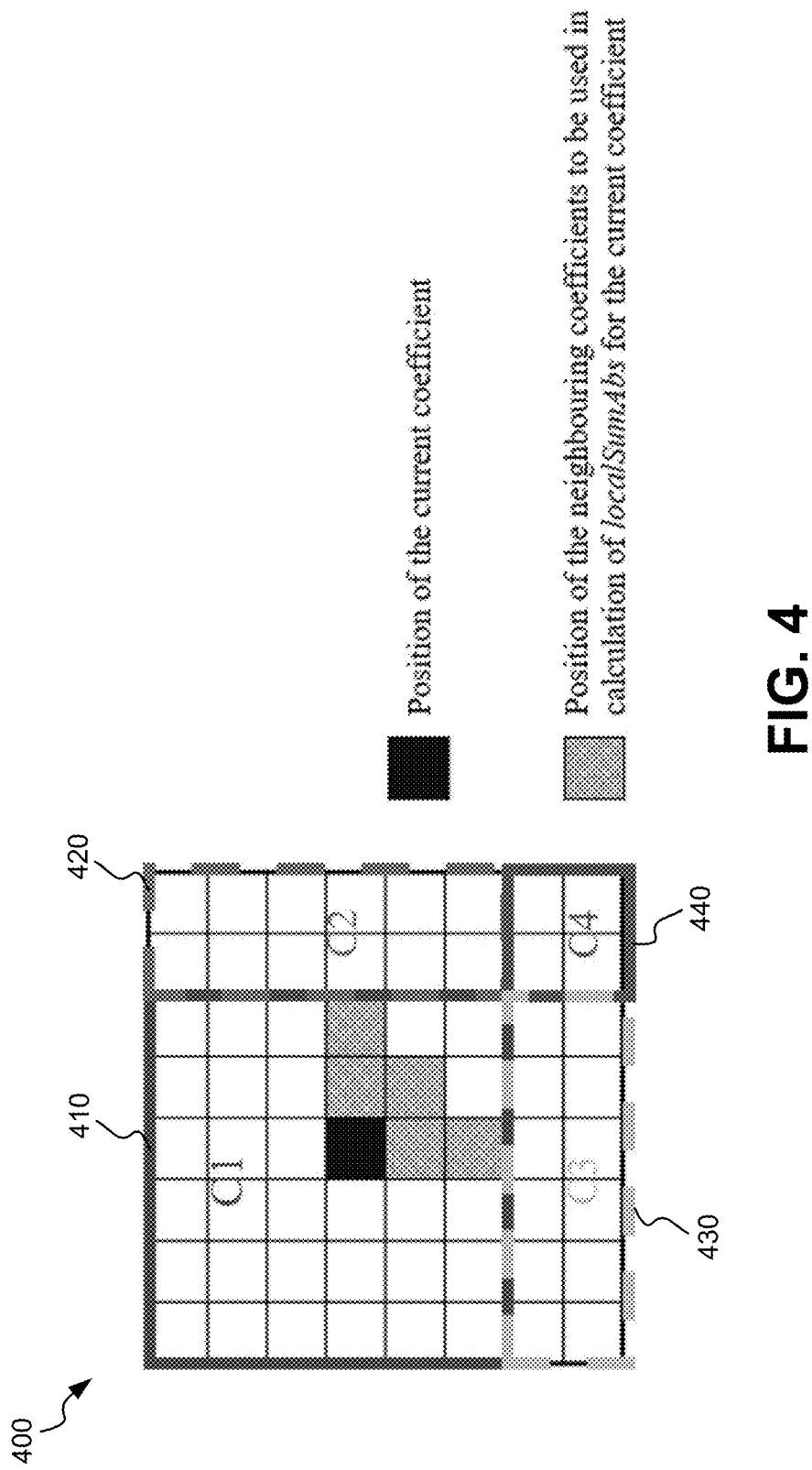
FIG. 4 is a diagram illustrating an example of different classifications applied to samples of a transform unit based at least in part on an interaction between a rice derivation template and spatial positions of the samples, in accordance with some examples.

In some examples, the systems and techniques disclosed herein (e.g., implemented by the encoding device 104 and/or the decoding device 112) can classify spatial positions of decoded coefficients within a transform block (e.g., a TU) based on anticipated (or estimated) accuracies of the template-based rice derivation method for the coefficients. One illustrative example of classification based on an anticipated accuracy of the template-based rice derivation is illustrated in FIG. 4. In some cases, the 8×8 sample grid depicted in FIG. 4 can be the same as or similar to the 8×8 sample grid discussed above with respect to FIG. 3. Similarly, the relative locations of the five neighboring transform coefficients with respect to the current coefficient can be the same in FIG. 4 as in FIG. 3, e.g., both figures make use of the same example rice derivation template.

The classification(s) of the anticipated accuracy of the template-based rice derivation can be based at least in part on the observation that the rice derivation template identifies the positions of the neighboring coefficients relative to the position of the current coefficient in a consistent manner (e.g., the same template is used each time rice parameter derivation is performed). Therefore, given the position of a current coefficient within a transform block (e.g., a TU) and the geometry of the rice derivation template, the number of neighboring transform coefficients that will fall outside the boundaries of the TU can be determined in advance. This number of unavailable neighboring transform coefficients can then be used to predict or estimate the accuracy of the rice parameter derivation that would result from the template-based method. In some examples, the number of unavailable neighboring transform coefficients and/or the anticipated accuracy of rice derivation can additionally determine how the historical rice parameter value is used (e.g., whether the presently disclosed systems and techniques are applied in the partially unavailable case or the completely unavailable case).

In the example of FIG. 4, an 8×8 grid of samples 400 is shown. The sample grid 400 can be a transform unit (TU) or a coded block, and is divided into four non-overlapping regions 410, 420, 430, and 440. As illustrated, each region can be assigned a different classification (e.g., C1, C2, C3, C4) according to the expected accuracy of rice parameter derivation. In other words, the expected accuracy of rice parameter derivation may be the same for all of the samples within each region, but not necessarily the same for samples located in different regions.

The samples (and associated transform coefficients) with spatial positions located within the first region 410 are denoted as class C1. Samples with the C1 classification can be those that are expected to have accurate rice parameter derivation (e.g., greater than an accuracy threshold) using the template-based method. According to such an example, the rice parameter derivation for C1 coefficients can be determined (e.g., by the video encoding device 104 and/or the video decoding device 112) as follows:

riceParam=template_based_method( )

where template_based_method( ) can be provided as the template-based rice parameter derivation defined in VVC clause 9.3.3.2 (reproduced above). In some examples, template_based_method( ) can be implemented using one or more of the possible modifications to VVC 9.3.3.2, also described above.

The samples (and associated transform coefficients) with spatial positions located within the fourth region 440 are denoted as class C4. Samples with the C4 classification can be those that are expected to have no accurate rice parameter derivation (e.g., less than an accuracy threshold or zero accuracy) using one or more of the template-based method previously described herein. In one illustrative example, the video encoding device 104 and/or the video decoding device 112 can use a history-based derivation method instead to obtain an accurate rice parameter derivation (e.g., by using one or more historical estimates of optimal rice parameters derived from a history of previously decoded coefficients). According to such an example, the video encoding device 104 and/or the video decoding device 112 can determine the rice parameter derivation for C4 coefficients as follows:

riceParam=history_based_method( )

The samples (and associated transform coefficients) with spatial positions located within the second region 420 are denoted as class C2. Samples and transform coefficients with spatial positions located within the third region are denoted as class C3. Samples with the C2 or C3 classifications can be those that are expected to have reduced accuracy rice parameter derivation (e.g., less than an accuracy threshold) using one or more of the template-based methods or modifications thereof previously described herein. In one illustrative example, the accuracy of rice parameter derivation for C2 and C3 coefficients can be improved by combining the template-based method, e.g., template_based_method( ) with the history-based derivation method, e.g., history_based_method( ) According to such an example, the video encoding device 104 and/or the video decoding device 112 can derive the rice parameter(s) for C2 and/or C3 coefficients as follows:

riceParam=function(template_based_method( ),history_based_method( ))

In some examples, classification can be based on the run of the scan order in inverse direction, e.g., assigning N first decoded coefficients to C4 and the remaining coefficients being classified as C1 (recalling that the inverse scan order begins with the bottom-right sample, which here would be located in C4).

In some cases, the video encoding device 104 and/or the video decoding device 112 can use one or more subsets of the defined classes described above. For example, in some cases, only C4 class decoded coefficients may use historical rice information, as the template-based method otherwise has an insufficient amount of neighboring coefficient values with which to derive rice parameters for current coefficients located within the C4 region 440. The C1 class uses no historical rice information to perform rice parameter derivation for current coefficients located within the C1 region 410—this is because for every possible location with C1, the neighboring coefficients defined by the rice template will all still be contained within the overall TU 400. Therefore, in some examples, support of the C1 class can be extended to incorporate one or more of the C2 region 420, the C3 region 430, and/or the entire TU 400, in which each case no history information is used for rice derivation.

Utilizing the techniques described herein, the video encoding device 104 and/or the video decoding device 112 can apply different techniques for the aggregation of local and historic information to derive a rice parameter, e.g., ricePar. In some examples, the video encoding device 104 and/or the video decoding device 112 can determine (e.g., calculate, compute, etc.) a weighted average based on rice information obtained from neighboring transform coefficients (e.g., riceParTemplate, per the template-based method) and historical rice parameter information (e.g., riceParHistory, per the history-based method). For instance, the video encoding device 104 and/or the video decoding device 112 can determine the weighted average based on the rice information obtained from the neighboring transform coefficients and the historical rice parameter information using the following equation:

$$ricePar=(w2*riceParTemplate+w1*riceParHistory)/(w1+w2)$$

In some cases, one or more of the weights w1 and w2 of the weighted average can be dependent on a spatial location of corresponding coefficients within the currently decoded TU.

In some examples, the weighted average can be an exponential weighted moving average.

Figure 5:
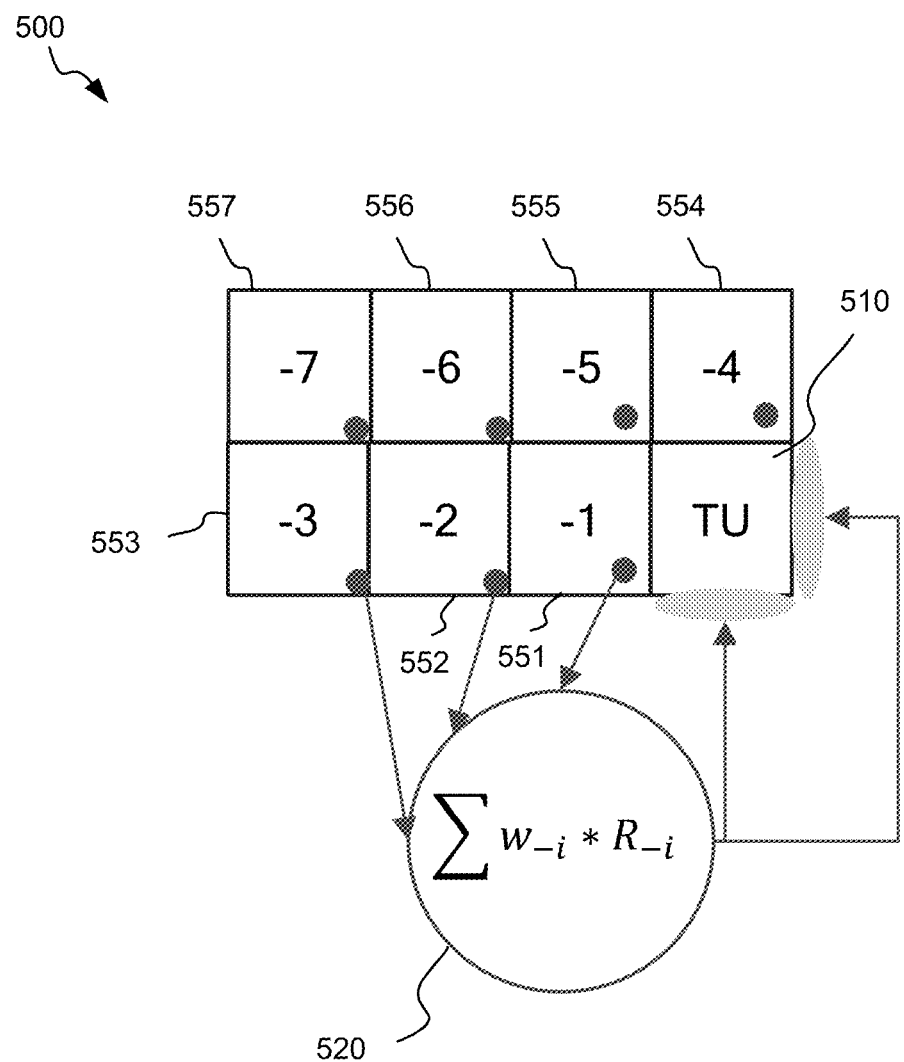
FIG. 5 is a diagram illustrating an example of a history update of a history counter for determining historic rice parameter values, in accordance with some examples.

FIG. 5 is a diagram illustrating an example of determining historical rice parameter information and/or historical rice parameter values based on previously decoded TUs. A series of TUs is shown in a grid 500. The bottom-right TU 510 is the currently decoded TU (e.g., where historical rice parameter information can be used to derive rice parameters for individual samples of the currently decoded TU). The remaining TUs 551-557 are previously decoded TUs, from which the historical rice parameter information can be calculated. The previously decoded TUs 551-557 are labeled with a time-step at which each TU was decoded, e.g., TU 551 was decoded one step prior, TU 552 was decoded two steps prior, TU 553 was decoded three steps prior, etc.

For each given one of the previously decoded TUs 551-557, the first non-zero transform coefficient that was decoded for that given TU is accumulated to a history counter 520. In some examples, the value accumulated to history counter 520 can be a magnitude of the first non-zero transform coefficient itself, a magnitude of a decoded rice parameter of the first non-zero transform coefficient, and/or a binary codelength (e.g., in bits) of the aforementioned coefficient or rice parameter. As illustrated, the history counter 520 can apply a weight w to each accumulated value R, e.g., in order to implement a weighted sum. From the weighted sum, a weighted average and/or an exponential weighted moving average can be calculated for the historic rice parameter value. In some cases, the weight w can be set equal to 1, in which case history counter 520 implements a sum, and an arithmetic average can be calculated for the historic rice parameter value.

In some examples, the video encoding device 104 and/or the video decoding device 112 can determine the weight w based on a spatial location of the first non-zero transform coefficient in the particular one of the previously decoded TUs 551-557 that is being used to obtain the value R. The spatial location can correspond to one of the classifications C1-C4 discussed above with respect to FIG. 4. The weight w can be a value between 0 and 1 and/or can be an integer value such as 1, 2, 3, etc.

The value R that is extracted from the first non-zero transform coefficient of each previously decoded TU 551-557 is used as an update to history counter 520 and can be referred to as a history update or history update value. The cumulative history update counter maintained by history counter 520 therefore represents a cumulative history sum (a weighted sum if w is not equal to 1) over the entire series of previously decoded TUs 551-557. In some examples, history counter 520 can be initialized to zero or another starting value at the beginning of a CTU and/or a slice, each of which can contain multiple TUs.

Based on the cumulative history value at history counter 520, an optimal historical rice parameter value can be used at current TU 510 to perform the history-based rice derivation described herein. For example, as mentioned previously, an arithmetic average or an exponential weighted moving average can be obtained from history counter 520 (or calculated based on one or more values obtained from history counter 520) and used as the historical rice parameter value. In FIG. 5, connector arrows run from the output of history counter 520 to the bottom and right edges of current TU 510, as the historical rice parameter value from history counter 520 may be utilized to derive rice parameters for samples located in either of these two areas of current TU 510. This is because, in some examples, the bottom and right edges of a given TU (e.g., such as current TU 510) contain the individual sample locations that are most likely to have one or more unavailable neighboring transform coefficients as defined by the rice derivation template (e.g., see classifications C2, C3, and C4 of FIG. 4, which are located on the bottom and right edges of the TU 400).

Provided below is an example of a technique that can be used by the video encoding device 104 and/or the video decoding device 112 for the aggregation of local neighboring coefficient information (e.g., obtained within the current TU based on the rice derivation template) and historic rice parameter information (e.g., obtained from previously decoded TUs 551-557 via history counter 520). As mentioned previously, historical rice parameter values can be used in a template-based rice derivation if local information of neighboring transform coefficients is not available or is only partially available. Shown below is a pseudocode example of how a template-based rice derivation approach can be extended to also provide history-based rice derivation. Additions to the existing template-based method are shown in underlined text ("*additions*"). The term histCoef defines an estimated historic transform coefficient, e.g., accumulated in the past or expressed to a historic rice parameter value, e.g., histCoef=1<<histRiceParam. The terms M and N are estimated weight values, e.g., integer values, which in some examples may be equal to 2 and 3, respectively.

```
unsigned templateAbsSum( int scanPos, const TCoeff* coeff, int baseLevel )
{
  const uint32_t posY = m_scan[scanPos].y;
  const uint32_t posX = m_scan[scanPos].x;
  const TCoeff* pData = coeff + posX + posY * m_width;
  TCoeff sum = 0;
  if (posX < m_width - 1)
  {
    sum += abs(pData[1]);
    if (posX < m_width - 2)
    {
      sum += abs(pData[2]);
    }
    else sum += histCoef;
    if (posY < m_height - 1)
    {
      sum += abs(pData[m_width + 1]);
    } else sum += histCoef;
    else sum += histCoef;
  }
    else sum += N * histCoef;
  if (posY < m_height - 1)
  {
    sum += abs(pData[m_width]);
    if (posY < m_height - 2)
    {
      sum += abs(pData[m_width << 1]);
    }
    else sum += histCoef;
  }
    else sum += M * histCoef;
  return unsigned(std::max<TCoeff>(std::min<TCoeff>(sum - 5 * baseLevel, 31),
0));
}
```

The systems and techniques described herein can apply different techniques for performing a history update. In some examples, the video encoding device 104 and/or the video decoding device 112 can implement a history parameter for rice derivation as a counter (e.g., history counter 520). In some cases, the video encoding device 104 and/or the video decoding device 112 can utilize a moving average value storage for decoded transform coefficients (e.g., of previously decoded TUs 551-557) and/or their corresponding rice parameters. In some examples, rather than using the actual value of a decoded transform coefficient or rice parameter, the video encoding device 104 and/or the video decoding device 112 can determine (e.g., calculate, compute, etc.) a length of the binary codeword required to express the decoded transform coefficient or corresponding rice parameter, such as based on the following:

codeLength=floorLog2((uint32_t)decodedCoef);

In one example, for each class identified by index rice-Class, the video encoding device 104 and/or the video decoding device 112 can calculate and store a separate history in counter StatCoeff[riceClass], such that a different historical rice parameter value will be utilized depending on the location(s) of the unavailable neighboring transform coefficients for the current TU. In some cases, during TU decoding, each decoded transform coefficient defined for inclusion in a history update can be expressed through a binary codelength estimate (e.g., such as codeLength above). The binary code length estimate can be used in the history update as indicative of the optimal historical rice parameter value.

For each previously decoded TU 551-557, the number of transform coefficients to be included in the history update for that TU can be given by NUM_HISTORY_UPDATE. In some examples, NUM_HISTORY_UPDATE is set equal to one, and only the first non-zero transform coefficient from each previously decoded TU is utilized. However, NUM_HISTORY_UPDATE could also be set to a value such as two or three, in which case the first two or the first three non-zero transform coefficients, respectively, would be used per previously decoded TU.

A number of decoded transform coefficients (e.g., equal to NUM_HISTORY_UPDATE) can be used to update the historic observations maintained at one or more history counters. In some examples, the historic observations can be stored and maintained by a history counter such a history counter 520. Separate counters can be used in the history update process, with one counter (e.g., collectStatCoeff) maintaining a cumulative sum of codelength and another counter (e.g., counterCollectStatCoeff) maintaining a cumulative sum of the number of coefficients or distinct entries that have been provided to the history update process:

collectStatCoeff[riceClass]+=codeLength.

counterCollectStatCoeff[riceClass]++;

After NUM_HISTORY_UPDATE number of samples defined for the history update of the current class and/or current TU are parsed as described above, a global history counter StatCoeff can be updated as follows through a linear model (e.g., a weighted moving average or an exponential weighted moving average):

int numCollected=NUM_HISTORY_UPDATE−counterCollectStatCoeff[i];

int averageRiceInTU=(int)(collectStatCoeff[i]+(numCollected>>1))/numCollected);

StatCoeff[i][compID]=(w3*StatCoeff[i][compID]+w4*averageRiceInTU)/(w3+w4);

In some examples, parameters of the linear model above can be selected as derivatives of a power of 2, to enable more efficient performance of low complexity multiplication and/or division operations.

In some examples, NUM_HISTORY_UPDATE can be set equal to one, meaning that only the first non-zero transform coefficient is parsed from each previously decoded TU and used to update the history counter for determining optimal historical rice parameters. In this case, the above expression for numCollected be simplified to numCollected=0 (or, the original expression above can be maintained, in order to account for instances in which no transform coefficients were collected for a given previously decoded TU, despite the fact that NUM_HISTORY_UPDATE was specified as being equal to one).

Continuing the example above, with NUM_HISTORY_UPDATE set equal to one and numCollected set equal to zero, then the second expression can be simplified as averageRiceInTU=collectStatCoeff. In other words, when only a single transform coefficient is collected per TU (e.g., the first non-zero transform coefficient is collected), then the value averageRiceInTU is the same as the collected value collectStatCoeff for that TU.

In some examples, the weights w3 and w4 can both be set equal to one, e.g., causing them to drop out of the third expression above for StatCoeff[i][compID]—with both weight values set to one, then the update value for StatCoeff is calculated as the average of the history update value just received and the prior StatCoeff value from just before the newest history update value was received. In some examples, NUM_HISTORY_UPDATE, w3, and w4 can each be set equal to one.

In some examples, a history counter can be maintained through a certain region of the decoded picture, e.g., full picture, slice, tile, group of CTUs, or a single CTU with normative reset at the start of the group of CTUs. At the start of each new region being decoded, the history counter can be reset to zero or otherwise initialized to some pre-determined starting value.

In examples in which a history counter is initialized with a default value at the beginning of each new region, in some cases the default value can be tabulated and provided to the decoder as side information, signaled through or with a coded bitstream (e.g., at the slice level), provided through a special update signaling mechanism, and/or derived at the decoder side from bit-depth, quantization parameters, or other syntax elements.

In some examples, one or more aspects of a history update process for rice parameter derivation as described herein (e.g., speed of update, parameters or weights of moving average, etc.) can be made dependent on one or more of the block size, ratio of block dimensions, coding modes (such as intra-prediction or inter-prediction), slice type, and/or signaled syntax elements associated with the decoding.

FIG. 6 is a flowchart illustrating an example of a process 600 for processing image and/or video data. At block 602, the process 600 can include obtaining a transform block, the transform block including a plurality of samples. In some examples, the transform block can be a coded or decoded transform block. In some examples, the transform block can be a transform unit (TU). In some cases, the transform block can the same as or similar to one or more of the transform blocks 320, 330, and 340 shown in FIG. 3.

At block 604, the process 600 includes determining one or more parameters (e.g., rice parameters) for the plurality of samples at least in part by analyzing a local neighborhood of a current sample of the plurality of samples. In some cases, block 604 can include scanning the transform block, which can include analyzing the local neighborhood of the current sample of the plurality of samples. In some examples, the local neighborhood of the current sample can be located inside of the same transform block as the current sample. For example, the local neighborhood can be given by the boundaries of the three transform blocks 320, 300, and 340 that are shown for a current sample 302 in FIG. 3.

In some cases, analyzing the local neighborhood can be performed by comparing the local neighborhood to a template support area. The template support area can be obtained as a parameter derivation template, such as a rice parameter derivation template (e.g., used to perform a template and lookup table-based rice parameter derivation). In some aspects, the one or more parameters (e.g., rice parameters) can be determined in the context of high bit-depth coding, where shortcomings of existing rice parameter derivation techniques based on lookup tables may be more commonly experienced.

At block 606, the process 600 includes determining that a number of neighboring transform coefficients of the current sample is less than a threshold amount. The determination can be based at least in part on the analysis of the local neighborhood (e.g., as described above with respect to block 604). In some examples, the threshold amount can be the same as the number of neighboring transform coefficients that are included in a parameter derivation template (e.g., a rice parameter derivation template).

In one illustrative example, the threshold amount can be equal to five, which is the number of neighboring transform coefficients included in the example template for rice parameter derivation that is depicted in FIG. 2. In some examples, the threshold amount can be greater than or less than five, and the rice parameter derivation template can include a greater or lesser number of neighboring coefficients than shown in FIG. 2.

In some cases, the determination that the number of neighboring transform coefficients of the current sample is less than a threshold amount can be used to determine that the template support area spans outside the boundaries of the transform block. For example, if the number of neighboring transform coefficients that are available to the current sample is less than the threshold number of transform coefficients included in the parameter derivation template (e.g., the rice parameter derivation template), then it can be determined that the template support area at least partially spans outside of the boundaries of the transform block (e.g., transform block 340 is shown in FIG. 3 as only having one available neighboring transform coefficient, 316, within its boundaries). In some cases, if the number of neighboring transform coefficients available to the current sample is zero, then it can be determined that the template support area entirely spans outside of the boundaries of the transform block (e.g., transform block 320 is shown in FIG. 3 as having zero available neighboring transform coefficients within its boundaries).

At block 608, the process 600 includes obtaining a historic parameter value (e.g., a historic rice parameter value) determined from one or more previously decoded transform blocks. In some examples, the historic parameter value can be obtained in response to the determination in block 606 that the number of available neighboring transform coefficients inside the transform block is less than the threshold number of transform coefficients that are included in a rice derivation template. In some cases, the historic parameter value (e.g., the historic rice parameter value) can be dynamically determined at block 608. In some examples, the historic parameter value (e.g., the historic rice parameter value) can be obtained or retrieved from a history counter that maintains a weighted sum by accumulating values that were determined for previously decoded transform blocks or TUs (e.g., history counter 520 as shown in FIG. 5).

In some examples, the historic parameter value (e.g., the historic rice parameter value) can be determined from one or more previously decoded transform blocks by using the history counter to apply a weight w to each accumulated value R, in order to implement a weighted sum. In some cases, the weighted sum can be used to calculate a weighted average and/or an exponential weighted moving average, which can then be used as the historic parameter value (e.g., the historic rice parameter value) obtained at block 608. In some cases, weight w can be determined based at least in part on a spatial location of a first non-zero transform coefficient in a given previously decoded transform block. In some aspects, the spatial location used to determine the weight w can correspond to one of the classifications C1-C4 as shown in FIG. 4. In some aspects, the weight w can be a value between 0 and 1 and/or can be an integer value. In some examples, the historic parameter value (e.g., the historic rice parameter value) can be calculated by updating the history counter until reaching the end of a CTU or a slice, at which time the history counter (and the historic rice parameter value) can be initialized to zero or some other starting value and the history update process repeated.

At block 610, the process 600 includes determining a parameter (e.g., a rice parameter) for the current sample. The process 600 can determine the parameter (e.g., the rice parameter) based at least in part on the historic parameter value (e.g., the historic rice parameter value) obtained at block 608, as described above. In some examples, the historic parameter value (e.g., the historic rice parameter value) can be used to replace each unavailable neighboring transform coefficient when a template-based parameter derivation approach (e.g., a template-based rice parameter derivation approach) is utilized. When the template-based neighboring transform coefficients are only partially unavailable, the rice parameter can be determined based on the sum of the available neighboring transform coefficients and N times the historic parameter value (e.g., historic rice parameter value), where N is equal to the number of unavailable neighboring transform coefficients (e.g., which can be determined at block 604).

At block 612, the process 600 includes decoding the current sample based on the determined parameter for the current sample. For example, as described herein, the process 600 can perform entropy decoding (e.g., using entropy decoding unit 80 described below with respect to FIG. 9) to decode the current sample based on the parameter. In one example, the decoding device 112 can decode the current sample at least in part by decoding a syntax element indicative of the current sample based on the determined parameter. In another example, the decoding device 112 can decode the current sample at least in part by decoding a Golomb-Rice code using the determined parameter.

Figure 7:
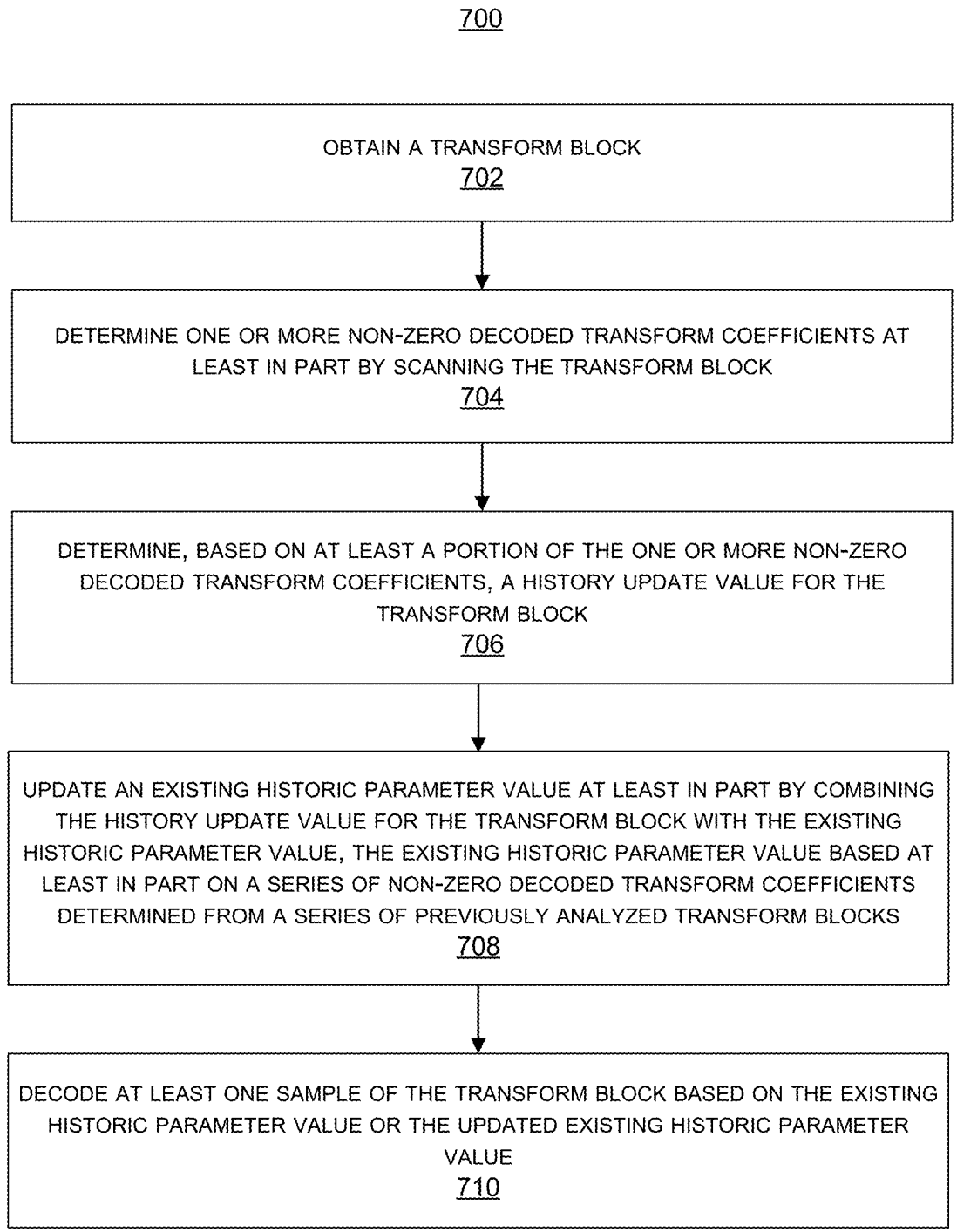
FIG. 7 is a flow chart illustrating another example of a process for deriving rice parameters, in accordance with some examples.

FIG. 7 is a flowchart illustrating an example of a process 700 for processing image and/or video data. At block 702, the process 700 can include obtaining a transform block. In some examples, the transform block can be a coded or decoded transform block. In some examples, the transform block can be a transform unit (TU). In some cases, the transform block can be the same as or similar to one or more of the transform blocks 320, 330, and 340 shown in FIG. 3.

At block 704, the process 700 can include determining one or more non-zero decoded transform coefficients at least in part based on an analysis of the transform block. In some cases, the analysis of the transform block can be performed by scanning the transform block. For example, scanning the transform block can be performed with a scan order in inverse direction (e.g., where an inverse scan order begins with the bottom-right sample of a transform block or TU). Scanning can continue until at least a first non-zero decoded transform coefficient is located. Where more than one non-zero decoded transform coefficients are to be determined, scanning can continue until a pre-determined quantity of non-zero decoded transform coefficients have been determined. In some examples, when a non-zero decoded transform coefficient is encountered during the scanning process, the non-zero value can be stored in a buffer or counter.

At block 706, the process 700 can include determining, based on at least a portion of the one or more non-zero decoded transform coefficients, a history update value for the transform block. In one illustrative example, the history update value can be determined from the first non-zero transform coefficient that was obtained when analyzing (e.g., scanning) the transform block at block 704. In some cases, the history update value for a given transform block can be equal to the value of the first non-zero decoded transform coefficient obtained when scanning the given transform block. In some examples, the history update value for the transform block is determined based on all of the non-zero decoded transform coefficients of the transform block. In some cases, the history update value is determined at least in part by averaging all of the non-zero decoded transform coefficients of the transform block.

In some examples, the history update value can be stored in a history counter that maintains a weighted sum by accumulating history update values that were determined for previously decoded transform blocks (e.g., history counter 520 as shown in FIG. 5).

At block 708, the process 700 can include updating an existing historic parameter value (e.g., an existing historic rice parameter value) at least in part by combining the history update value for the transform block with the existing historic parameter value. In some aspects, combining the history update value for the transform block with the existing historic parameter value can include averaging the history update value for the transform block with the existing historic parameter value. In some cases, the existing historic parameter value is an existing historic rice parameter value.

In some aspects, combining the history update value for the transform block with the existing historic parameter value can include determining an exponential weighted moving average between the history update value for the transform block and the existing historic parameter value. In some cases, the process 700 can include assigning a first weight to the history update value for the transform block and a second weight to the existing historic parameter value. In such cases, determining the exponential weighted moving average is based at least in part on the first weight and the second weight.

In some aspects, the history update value for the transform block is determined based on a first non-zero decoded transform coefficient determined in the analysis of the transform block. In some cases, the first non-zero decoded transform coefficient is determined based on a run scan order of the transform block in inverse direction. In some cases, the history update value for the transform block is determined at least in part by determining a binary codelength of the first non-zero decoded transform coefficient.

In some aspects, the transform block and the previously analyzed transform blocks are associated with a first slice. In some cases, the existing historic parameter value is iteratively updated based on successive history update values determined for successively analyzed transform blocks associated with a same slice. In some examples, the process 700 includes initializing the existing historic parameter value to a pre-determined value. The initializing is performed prior to analyzing a first transform block of the first slice and determining a history update value for the first transform block.

For example, the existing historic parameter value (e.g., the existing historic rice parameter value) can be based at least in part on a series of non-zero decoded transform coefficients determined from a series of previously analyzed (e.g., previously scanned) transform blocks. In some examples, the existing historic parameter value (e.g., the existing historic rice parameter value) can be determined from one or more previously decoded transform blocks by using the history counter to apply a weight w to each accumulated value R, such as to implement or determine a weighted sum.

In some cases, the weighted sum can be used to calculate a weighted average and/or an exponential weighted moving average. In one illustrative example, the weight w can be set equal to 1 for each accumulated value. In some cases, the weight w can be determined based at least in part on a spatial location of the first non-zero transform coefficient in a given previously decoded transform block. In some aspects, the spatial location used to determine the weight w can correspond to one of the classifications C1-C4 as shown in FIG. 4. In some aspects, the weight w can be a value between 0 and 1 and/or can be an integer value. In some examples, the historic rice parameter value can be calculated by updating the history counter until reaching the end of a CTU or a slice, at which time the history counter (and the historic rice parameter value) can be initialized to zero or some other starting value and the history update process repeated.

At block 710, the process 700 includes decoding at least one sample of the transform block based on the existing historic parameter value or the updated existing historic parameter value. For example, as described herein, the process 700 can perform entropy decoding (e.g., using entropy decoding unit 80 described below with respect to FIG. 9) to decode the current sample based on the existing historic parameter value or the updated existing historic parameter value. In one example, the decoding device 112 can decode the current sample at least in part by decoding a syntax element indicative of the at least one sample based on the existing historic parameter value or the updated existing historic parameter value. In another example, the decoding device 112 can decode the current sample at least in part by decoding a Golomb-Rice code using the existing historic parameter value or the updated existing historic parameter value.

In some aspects, a process of encoding video data can include obtaining a transform block that includes a plurality of samples. The process can include determining one or more parameters for the plurality of samples at least in part by analyzing a local neighborhood of a current sample of the plurality of samples. The process can further include determining, based at least in part on the analysis of the local neighborhood, that a number of neighboring transform coefficients of the current sample is less than a threshold amount. In some cases, the process can determine that the number of neighboring transform coefficients is less than the threshold amount based at least in part on identifying one or more unavailable neighboring transform coefficients for the current sample. In such cases, the one or more unavailable neighboring transform coefficients can be associated with a location outside of the transform block. In some examples, the process can include obtaining a location of the current sample within the transform block, comparing the location of the current sample to a width of the transform block, a height of the transform block or the width and height of the transform block, and, based at least in part on the comparison, identifying the one or more unavailable neighboring transform coefficients. In some cases, to determine that the number of neighboring transform coefficients is less than the threshold amount, the process can include determining that a horizontal component of the location of the current sample is within a first distance of the width of the transform block and determining that a vertical component of the location of the current sample is within a second distance of the height of the transform block.

The process of encoding video data can further include obtaining a historic parameter value determined from one or more previously encoded transform blocks. The process of encoding video data can further include determining, based at least in part on the historic parameter value, a parameter for the current sample. In some examples, the one or more parameters for the plurality of samples include one or more rice parameters, the historic parameter value is a historic rice parameter value, and the parameter determined for the current sample is a rice parameter for the current sample.

In some examples, the process of encoding video data can include determining, based at least in part on a determination that the number of neighboring transform coefficients is zero, the parameter for the current sample based on a first integer multiple of the historic parameter value. In some aspects, the process can determine the parameter for the current sample at least in part by providing, as input to a look-up table that maps between inputs and parameters, the first integer multiple of the historic parameter value. In some cases, the first integer multiple and the threshold amount are a same value. In some aspects, the process can include determining, based at least in part on a determination that the number of neighboring transform coefficients is greater than zero, the parameter for the current sample based on a second integer multiple of the historic parameter value and a sum of the neighboring transform coefficients. In such aspects, the second integer multiple is less than the first integer multiple. Further in such aspects, the process can determine the parameter for the current sample at least in part by providing, as input to a look-up table that maps between inputs and parameters, the second integer multiple of the historic parameter value summed with the sum of the neighboring transform coefficients.

In some examples, the plurality of samples is associated with a transform block sample type. For instance, the transform block sample type can include luma samples or chroma samples. In some cases, the transform block sample type is the same as a sample type associated with the one or more previously decoded transform blocks from which the historic parameter value is determined.

In some aspects, the historic parameter value is determined based at least in part on a first non-zero decoded transform coefficient obtained from each of the one or more previously coded transform blocks. In some examples, the process can include determining a binary codelength for each first non-zero decoded transform coefficient obtained from each of the one or more previously coded transform blocks. In some cases, the historic parameter value is determined as an exponential weighted moving average of the binary codelength determined for the first non-zero coded transform coefficient of each of the one or more previously coded transform blocks.

The process can further include generating a bitstream based on the determined parameter for the current sample. For example, the encoding device 104 (e.g., using the entropy encoding unit 56) can generate a bitstream based on the determined parameter (e.g., rice parameter).

In some examples, a process of encoding video data is provided. The process can include obtaining a transform block. The process can further include determining one or more non-zero coded transform coefficients at least in part based on an analysis of the transform block. The process can include determining, based on at least a portion of the one or more non-zero coded transform coefficients, a history update value for the transform block.

The process of encoding video data can include determining the history update value for the transform block based on a first non-zero coded transform coefficient determined in the analysis of the transform block. In some examples, the process can include determining the first non-zero coded transform coefficient based on a run scan order of the transform block in inverse direction. In some cases, the process can include determining the history update value for the transform block at least in part by determining a binary codelength of the first non-zero coded transform coefficient. In some cases, the process can include determining the history update value for the transform block based on all of the non-zero coded transform coefficients of the transform block. In some examples, the process can include determining the history update value at least in part by averaging all of the non-zero coded transform coefficients of the transform block.

The process of encoding video data can further include updating an existing historic parameter value at least in part by combining (e.g., averaging or otherwise combining) the history update value for the transform block with the existing historic parameter value. In some aspects, the existing historic parameter value is an existing historic rice parameter value. The existing historic parameter value is based at least in part on a series of non-zero coded transform coefficients determined from a series of previously analyzed transform blocks. In some aspects, to update the existing historic parameter value, the process can include determining an exponential weighted moving average between the history update value for the transform block and the existing historic parameter value. For example, in some cases, the process can include assigning a first weight to the history update value for the transform block and a second weight to the existing historic parameter value and determining the exponential weighted moving average based at least in part on the first weight and the second weight.

In some aspects, the transform block and the previously analyzed transform blocks are associated with a first slice. The process can further include iteratively updating the existing historic parameter value based on successive history update values determined for successively analyzed transform blocks associated with a same slice. In some cases, the process can include initializing the existing historic parameter value to a pre-determined value. In some examples, the process can perform the initializing prior to analyzing a first transform block of the first slice and determining a history update value for the first transform block.

The process of encoding video data can further include generating a bitstream based on the existing historic parameter value or the updated existing historic parameter value. For example, the encoding device 104 (e.g., using the entropy encoding unit 56) can generate a bitstream based on the determined parameter (e.g., rice parameter).

In some implementations, the processes (or methods) described herein can be performed by a computing device or an apparatus, such as the system 100 shown in FIG. 1. For example, the processes can be performed by the encoding device 104 shown in FIG. 1 and FIG. 8, by another video source-side device or video transmission device, by the decoding device 112 shown in FIG. 1 and FIG. 9, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED)

display, or another type of display device. Various embodiments of the application have been described.

Figure 8:
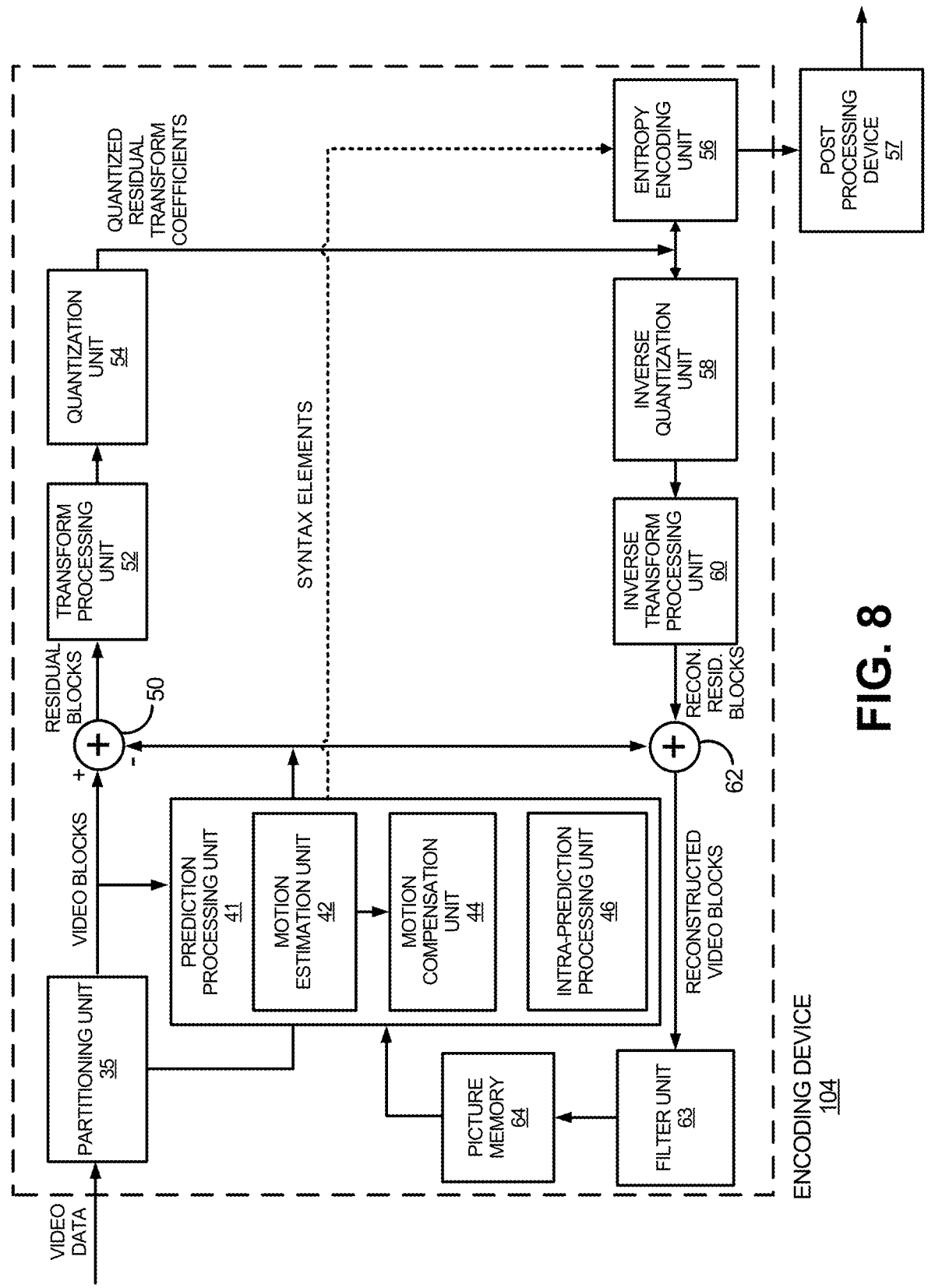
FIG. 8 is a block diagram illustrating an example video encoding device, in accordance with some examples.
Figure 9:
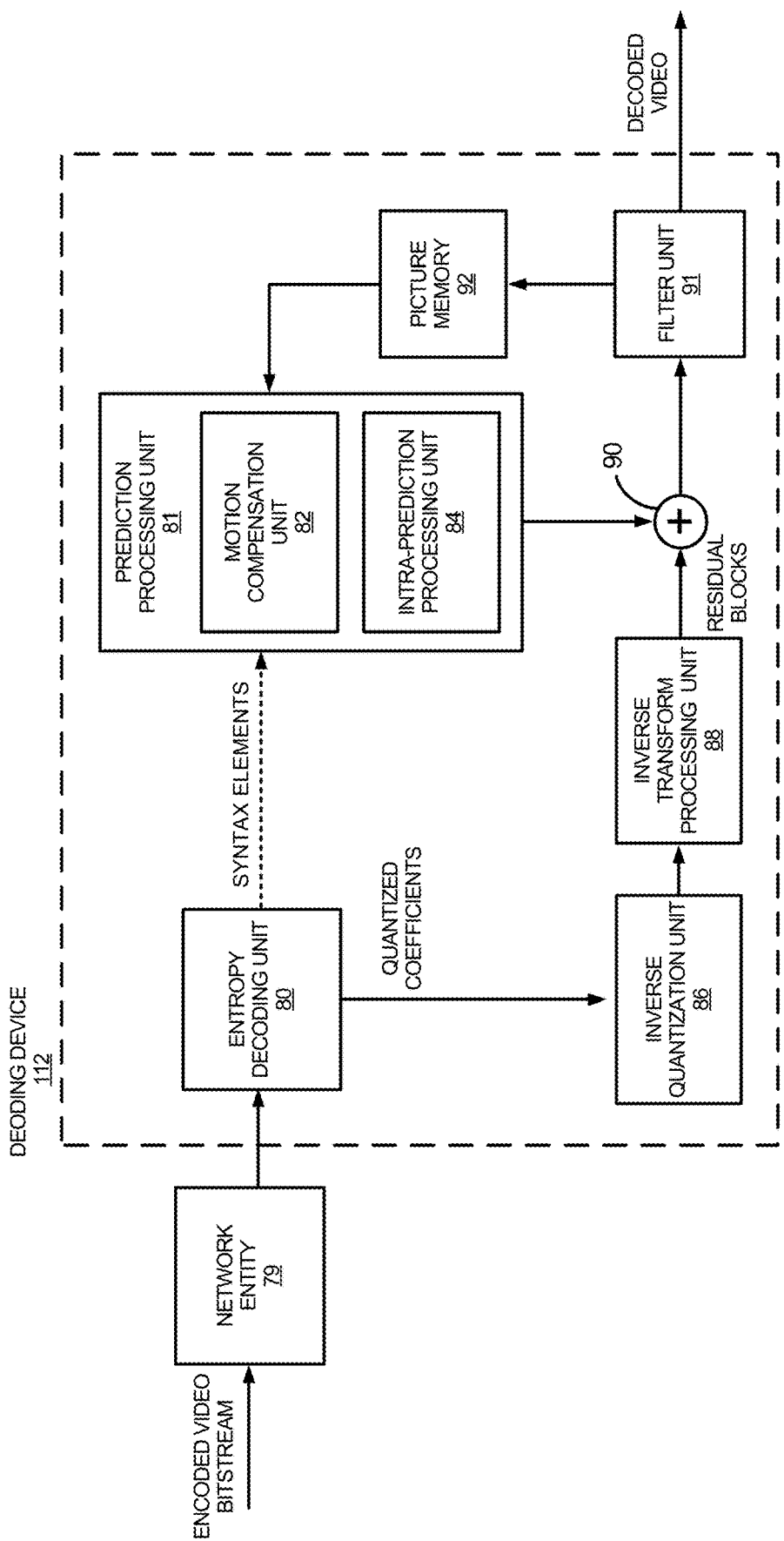
FIG. 9 is a block diagram illustrating an example video decoding device, in accordance with some examples.

Specific details of the encoding device 104 and the decoding device 112 are shown in FIG. 8 and FIG. 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 8, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 8 represents an example of a video encoder configured to perform the techniques described herein. For instance, the encoding device 104 may perform any of the techniques described herein, including the processes described herein. In some cases, some of the techniques of this disclosure may also be implemented by post processing device 57.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 8.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 9 represents an example of a video decoder configured to perform the techniques described herein. For instance, the decoding device 112 may perform any of the techniques described herein, including the processes described herein.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. While illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1: A method of decoding video data, the method comprising: obtaining a transform block, the transform block including a plurality of samples; determining one or more parameters for the plurality of samples at least in part by analyzing a local neighborhood of a current sample of the plurality of samples; determining, based at least in part on the analysis of the local neighborhood, that a number of neighboring transform coefficients of the current sample is less than a threshold amount; obtaining a historic parameter value determined from one or more previously decoded transform blocks; based at least in part on the historic parameter value, determining a parameter for the current sample; and decoding the current sample based on the determined parameter for the current sample.

Aspect 2: The method of Aspect 1, further comprising: based at least in part on a determination that the number of neighboring transform coefficients is zero, determining the parameter for the current sample based on a first integer multiple of the historic parameter value.

Aspect 3: The method of Aspect 2, wherein determining the parameter for the current sample comprises providing, as input to a look-up table that maps between inputs and parameters, the first integer multiple of the historic parameter value.

Aspect 4: The method of any of Aspects 2 or 3, wherein the first integer multiple and the threshold amount are a same value.

Aspect 5: The method of any of Aspects 2 to 4, further comprising: based at least in part on a determination that the number of neighboring transform coefficients is greater than zero, determining the parameter for the current sample based on a second integer multiple of the historic parameter value and a sum of the neighboring transform coefficients.

Aspect 6: The method of Aspect 5, wherein determining the parameter for the current sample comprises providing, as input to a look-up table that maps between inputs and parameters, the second integer multiple of the historic parameter value summed with the sum of the neighboring transform coefficients.

Aspect 7: The method of Aspect 6, wherein the second integer multiple is less than the first integer multiple.

Aspect 8: The method of any of Aspects 1 to 7, wherein determining that the number of neighboring transform coefficients is less than the threshold amount is based at least in part on identifying one or more unavailable neighboring transform coefficients for the current sample.

Aspect 9: The method of Aspect 8, further comprising: obtaining a location of the current sample within the transform block; comparing the location of the current sample to one or more of a width of the transform block and a height of the transform block; and based at least in part on the comparison, identifying the one or more unavailable neighboring transform coefficients.

Aspect 10: The method of Aspect 9, wherein the one or more unavailable neighboring transform coefficients are associated with a location outside of the transform block.

Aspect 11: The method of any of Aspects 9 or 10, wherein determining that the number of neighboring transform coefficients is less than the threshold amount comprises: determining that a horizontal component of the location of the current sample is within a first distance of the width of the transform block; and determining that a vertical component of the location of the current sample is within a second distance of the height of the transform block.

Aspect 12: The method of any of Aspects 1 to 11, wherein the plurality of samples is associated with a transform block sample type, the transform block sample type including luma samples or chroma samples.

Aspect 13: The method of Aspect 12, wherein the transform block sample type is the same as a sample type associated with the one or more previously decoded transform blocks from which the historic parameter value is determined.

Aspect 14: The method of any of Aspects 1 to 13, wherein the historic parameter value is determined based at least in part on a first non-zero decoded transform coefficient obtained from each of the one or more previously decoded transform blocks.

Aspect 15: The method of Aspect 14, further comprising determining a binary codelength for each first non-zero decoded transform coefficient obtained from each of the one or more previously decoded transform blocks.

Aspect 16: The method of Aspect 15, wherein the historic parameter value is determined as an exponential weighted moving average of the binary codelength determined for the first non-zero decoded transform coefficient of each of the one or more previously decoded transform blocks.

Aspect 17: The method of any of Aspects 1 to 16, wherein the one or more parameters for the plurality of samples include one or more rice parameters, the historic parameter value is a historic rice parameter value, and the parameter determined for the current sample is a rice parameter for the current sample.

Aspect 18: The method of any of Aspects 1 to 17, wherein decoding the current sample based on the determined parameter for the current sample comprises decoding a syntax element indicative of the current sample based on the determined parameter Aspect 19: The method of any of Aspects 1 to 18, wherein decoding the current sample based on the determined parameter comprises decoding a Golomb-Rice code using the determined parameter Aspect 20: A method of decoding video data, the method comprising: obtaining a transform block; determining one or more non-zero decoded transform coefficients at least in part based on an analysis of the transform block; determining, based on at least a portion of the one or more non-zero decoded transform coefficients, a history update value for the transform block; and updating an existing historic parameter value at least in part by combining the history update value for the transform block with the existing historic parameter value, the existing historic parameter value based at least in part on a series of non-zero decoded transform coefficients determined from a series of previously analyzed transform blocks; and decoding at least one sample of the transform block based on the existing historic parameter value or the updated existing historic parameter value.

Aspect 21: The method of Aspect 20, wherein combining the history update value for the transform block with the existing historic parameter value comprises averaging the history update value for the transform block with the existing historic parameter value Aspect 22: The method of any of Aspects 20 or 21, wherein combining the history update value for the transform block with the existing historic parameter value comprises determining an exponential weighted moving average between the history update value for the transform block and the existing historic parameter value.

Aspect 23: The method of Aspect 22, further comprising assigning a first weight to the history update value for the transform block and a second weight to the existing historic parameter value, wherein determining the exponential weighted moving average is based at least in part on the first weight and the second weight.

Aspect 24: The method of any of Aspects 20 to 23, wherein the history update value for the transform block is determined based on a first non-zero decoded transform coefficient determined in the analysis of the transform block.

Aspect 25: The method of Aspect 24, wherein the first non-zero decoded transform coefficient is determined based on a run scan order of the transform block in inverse direction.

Aspect 26: The method of any of Aspects 24 or 25, wherein the history update value for the transform block is determined at least in part by determining a binary codelength of the first non-zero decoded transform coefficient.

Aspect 27: The method of any of Aspects 20 to 26, wherein: the transform block and the previously analyzed transform blocks are associated with a first slice; and the existing historic parameter value is iteratively updated based on successive history update values determined for successively analyzed transform blocks associated with a same slice.

Aspect 28: The method of Aspect 27, further comprising initializing the existing historic parameter value to a predetermined value, wherein the initializing is performed prior to analyzing a first transform block of the first slice and determining a history update value for the first transform block.

Aspect 29: The method of any of Aspects 20 to 28, wherein the history update value for the transform block is determined based on all of the non-zero decoded transform coefficients of the transform block.

Aspect 30: The method of Aspect 29, wherein the history update value is determined at least in part by averaging all of the non-zero decoded transform coefficients of the transform block.

Aspect 31: The method of any of Aspects 20 to 30, wherein the existing historic parameter value is an existing historic rice parameter value.

Aspect 32. The method of any of Aspects 20 to 31, wherein decoding the at least one sample of the transform block comprises decoding a syntax element indicative of the at least one sample based on the existing historic parameter value or the updated existing historic parameter value.

Aspect 33. The method of any of Aspects 20 to 32, decoding the at least one sample of the transform block comprises decoding a Golomb-Rice code using the existing historic parameter value or the updated existing historic parameter value.

Aspect 34: An apparatus for decoding video data, comprising: at least one memory; and at least one processor coupled to the at least one memory, the at least one processor configured to: obtain a transform block, the transform block including a plurality of samples; determine one or more parameters for the plurality of samples at least in part by analyzing a local neighborhood of a current sample of the plurality of samples; determine, based at least in part on the analysis of the local neighborhood, that a number of neighboring transform coefficients of the current sample is less than a threshold amount; obtain a historic parameter value determined from one or more previously decoded transform blocks; based at least in part on the historic parameter value, determine a parameter for the current sample; and decode the current sample based on the determined parameter for the current sample.

Aspect 35: The apparatus of Aspect 34, wherein the at least one processor is configured to: based at least in part on a determination that the number of neighboring transform coefficients is zero, determine the parameter for the current sample based on a first integer multiple of the historic parameter value.

Aspect 36: The apparatus of Aspect 35, wherein, to determine the parameter for the current sample, the at least one processor is configured to: provide, as input to a look-up table that maps between inputs and parameters, the first integer multiple of the historic parameter value.

Aspect 37: The apparatus of any of Aspects 35 or 36, wherein the first integer multiple and the threshold amount are a same value.

Aspect 38: The apparatus of any of Aspects 35 to 37, wherein the at least one processor is configured to: based at least in part on a determination that the number of neighboring transform coefficients is greater than zero, determine the parameter for the current sample based on a second integer multiple of the historic parameter value and a sum of the neighboring transform coefficients.

Aspect 39: The apparatus of Aspect 38, wherein, to determine the parameter for the current sample, the at least one processor is configured to: provide, as input to a look-up table that maps between inputs and parameters, the second integer multiple of the historic parameter value summed with the sum of the neighboring transform coefficients.

Aspect 40: The apparatus of Aspect 39, wherein the second integer multiple is less than the first integer multiple.

Aspect 41: The apparatus of any of Aspects 34 to 40, wherein the at least one processor is configured to determine that the number of neighboring transform coefficients is less than the threshold amount based at least in part on identifying one or more unavailable neighboring transform coefficients for the current sample.

Aspect 42: The apparatus of Aspect 41, wherein the at least one processor is configured to: obtain a location of the current sample within the transform block; compare the location of the current sample to one or more of a width of the transform block and a height of the transform block; and based at least in part on the comparison, identify the one or more unavailable neighboring transform coefficients.

Aspect 43: The apparatus of Aspect 42, wherein the one or more unavailable neighboring transform coefficients are associated with a location outside of the transform block.

Aspect 44: The apparatus of any of Aspect 42 or 43, wherein, to determine that the number of neighboring transform coefficients is less than the threshold amount, the at least one processor is configured to: determine that a horizontal component of the location of the current sample is within a first distance of the width of the transform block; and determine that a vertical component of the location of the current sample is within a second distance of the height of the transform block.

Aspect 45: The apparatus of any of Aspects 34 to 44, wherein the plurality of samples is associated with a transform block sample type, the transform block sample type including luma samples or chroma samples.

Aspect 46: The apparatus of Aspect 45, wherein the transform block sample type is the same as a sample type associated with the one or more previously decoded transform blocks from which the historic parameter value is determined.

Aspect 47: The apparatus of any of Aspects 34 to 46, wherein the at least one processor is configured to: determine the historic parameter value based at least in part on a first non-zero decoded transform coefficient obtained from each of the one or more previously decoded transform blocks.

Aspect 48: The apparatus of Aspect 47, wherein the at least one processor is configured to: determine a binary codelength for each first non-zero decoded transform coefficient obtained from each of the one or more previously decoded transform blocks.

Aspect 49: The apparatus of Aspect 48, wherein the at least one processor is configured to: determine the historic parameter value as an exponential weighted moving average of the binary codelength determined for the first non-zero decoded transform coefficient of each of the one or more previously decoded transform blocks.

Aspect 50: The apparatus of any of Aspects 34 to 49, wherein the one or more parameters for the plurality of samples include one or more rice parameters, the historic parameter value is a historic rice parameter value, and the parameter determined for the current sample is a rice parameter for the current sample.

Aspect 50: The apparatus of any of Aspects 34 to 50, wherein decoding the current sample based on the determined parameter for the current sample comprises decoding a syntax element indicative of the current sample based on the determined parameter.

Aspect 50: The apparatus of any of Aspects 34 to 51, wherein decoding the current sample based on the determined parameter comprises decoding a Golomb-Rice code using the determined parameter.

Aspect 51: An apparatus for decoding video data, comprising: at least one memory; and at least one processor coupled to the at least one memory, the at least one processor configured to: obtain a transform block; determine one or more non-zero decoded transform coefficients at least in part based on an analysis of the transform block; determine, based on at least a portion of the one or more non-zero decoded transform coefficients, a history update value for the transform block; and update an existing historic parameter value at least in part by combining the history update value for the transform block with the existing historic parameter value, the existing historic parameter value based at least in part on a series of non-zero decoded transform coefficients determined from a series of previously analyzed transform blocks.

Aspect 52: The apparatus of Aspect 51, wherein, to combine the history update value for the transform block with the existing historic parameter value, the at least one processor is configured to: average the history update value for the transform block with the existing historic parameter value Aspect 53: The apparatus of any of Aspects 51 or 52, wherein, to combine the history update value for the transform block with the existing historic parameter value, the at least one processor is configured to: determine an exponential weighted moving average between the history update value for the transform block and the existing historic parameter value.

Aspect 54: The apparatus of Aspect 53, wherein the at least one processor is configured to: assign a first weight to the history update value for the transform block and a second weight to the existing historic parameter value; and determine the exponential weighted moving average based at least in part on the first weight and the second weight.

Aspect 55: The apparatus of any of Aspects 51 to 54, wherein the at least one processor is configured to determine the history update value for the transform block based on a first non-zero decoded transform coefficient determined in the analysis of the transform block.

Aspect 56: The apparatus of Aspect 55, wherein the at least one processor is configured to determine the first non-zero decoded transform coefficient based on a run scan order of the transform block in inverse direction.

Aspect 57: The apparatus of any of Aspects 55 or 56, wherein the at least one processor is configured to determine the history update value for the transform block at least in part by determining a binary codelength of the first non-zero decoded transform coefficient.

Aspect 58: The apparatus of any of Aspects 51 to 57, wherein: the transform block and the previously analyzed transform blocks are associated with a first slice; and the at least one processor is configured to iteratively update the existing historic parameter value based on successive history update values determined for successively analyzed transform blocks associated with a same slice.

Aspect 59: The apparatus of Aspect 58, wherein the at least one processor is configured to initialize the existing historic parameter value to a pre-determined value, wherein the initializing is performed prior to analyzing a first transform block of the first slice and determining a history update value for the first transform block.

Aspect 60: The apparatus of any of Aspects 51 to 59, wherein the at least one processor is configured to determine the history update value for the transform block based on all of the non-zero decoded transform coefficients of the transform block.

Aspect 61: The apparatus of Aspect 60, wherein the at least one processor is configured to determine the history update value at least in part by averaging all of the non-zero decoded transform coefficients of the transform block.

Aspect 62: The apparatus of any of Aspects 51 to 61, wherein the existing historic parameter value is an existing historic rice parameter value.

Aspect 63: The apparatus of any of Aspects 51 to 62, wherein decoding the at least one sample of the transform block comprises decoding a syntax element indicative of the at least one sample based on the existing historic parameter value or the updated existing historic parameter value.

Aspect 64: The apparatus of any of Aspects 51 to 63, wherein decoding the at least one sample of the transform block comprises decoding a Golomb-Rice code using the existing historic parameter value or the updated existing historic parameter value.

Aspect 65: A non-transitory computer-readable storage medium having stored thereon instructions which, when executed by one or more processors, cause the one or more processors to perform any of the operations of Aspects 1 to 64.

Aspect 66: An apparatus comprising means for performing any of the operations of Aspects 1 to 64.

Aspect 67: A method of processing video data, the method comprising: obtaining a plurality of coefficients associated with a block of video data; determining a classification for a spatial position of a coefficient of the plurality of coefficients based on an estimated accuracy of a template-based derivation technique for deriving a rice parameter for the coefficient; determining the rice parameter for the coefficient based on the classification; and generating a bitstream based on the determined parameter for the current sample.

Aspect 68: The method of Aspect 67, further comprising: determining the rice parameter using the template-based derivation technique based on the estimated accuracy being greater than an accuracy threshold.

Aspect 69: The method of Aspect 67, further comprising: determining the rice parameter using a history-based derivation technique based on the estimated accuracy being less than an accuracy threshold.

Aspect 70: The method of Aspect 67, further comprising: determining the rice parameter using a function based on the estimated accuracy being less than an accuracy threshold, the function being based on the template-based derivation technique and a history-based derivation technique.

Aspect 71: The method of Aspect 70, wherein the function includes a weighted average.

Aspect 72: The method of Aspect 70, wherein the function is integrated in the template-based derivation technique.

Aspect 73: The method of any one of Aspects 67 to 72, wherein the classification is determined based on a run of a scan order in an inverse direction.

Aspect 74: The method of any one of Aspects 67 to 73, further comprising generating an encoded video bitstream including the plurality of coefficients.

Aspect 75: The method of any one of Aspects 67 to 73, further comprising obtaining the plurality of coefficients from an encoded video bitstream.

Aspect 76: An apparatus comprising a memory configured to store video data and a processor configured to: obtain a plurality of coefficients associated with a block of video data; determine a classification for a spatial position of a coefficient of the plurality of coefficients based on an estimated accuracy of a template-based derivation technique for deriving a rice parameter for the coefficient; determine the rice parameter for the coefficient based on the classification; and generate a bitstream based on the determined parameter for the current sample.

Aspect 77: The apparatus of Aspect 76, further comprising: determining the rice parameter using the template-based derivation technique based on the estimated accuracy being greater than an accuracy threshold.

Aspect 78: The apparatus of Aspect 76, further comprising: determining the rice parameter using a history-based derivation technique based on the estimated accuracy being less than an accuracy threshold.

Aspect 79: The apparatus of Aspect 76, further comprising: determining the rice parameter using a function based on the estimated accuracy being less than an accuracy threshold, the function being based on the template-based derivation technique and a history-based derivation technique.

Aspect 80: The apparatus of Aspect 79, wherein the function includes a weighted average.

Aspect 81: The apparatus of Aspect 79, wherein the function is integrated in the template-based derivation technique.

Aspect 82: The apparatus of any one of Aspects 76 to 81, wherein the classification is determined based on a run of a scan order in an inverse direction.

Aspect 83: The apparatus of any one of Aspects 76 to 82, further comprising generating an encoded video bitstream including the plurality of coefficients.

Aspect 84: The apparatus of any one of Aspects 76 to 82, further comprising obtaining the plurality of coefficients from an encoded video bitstream.

Aspect 85: The apparatus of Aspect 68, wherein the apparatus includes an encoder.

Aspect 86: The apparatus of Aspect 68, wherein the apparatus includes a decoder.

Aspect 87: The apparatus of any one of Aspects 68 to 78, wherein the apparatus is a mobile device.

Aspect 88: The apparatus of any one of Aspects 68 to 79, wherein the apparatus is an extended reality device.

Aspect 89: The apparatus of any one of Aspects 68 to 80, further comprising a display configured to display the video data.

Aspect 90: The apparatus of any one of Aspects 68 to 81, further comprising a camera configured to capture one or more pictures.

Aspect 91: A computer readable medium having stored thereon instructions that when executed by a processor perform the methods of any of Aspects 67 to 90.

Aspect 92: An apparatus comprising means for performing the operations of any of Aspects 67 to 90.

Aspect 93: A method of encoding video data, the method comprising: obtaining a transform block, the transform block including a plurality of samples; determining one or more parameters for the plurality of samples at least in part by analyzing a local neighborhood of a current sample of the plurality of samples; determining, based at least in part on the analysis of the local neighborhood, that a number of neighboring transform coefficients of the current sample is less than a threshold amount; obtaining a historic parameter value determined from one or more previously encoded transform blocks; based at least in part on the historic parameter value, determining a parameter for the current sample; and generating a bitstream based on the existing historic parameter value or the updated existing historic parameter value.

Aspect 94: The method of Aspect 93, further comprising: based at least in part on a determination that the number of neighboring transform coefficients is zero, determining the parameter for the current sample based on a first integer multiple of the historic parameter value.

Aspect 95: The method of Aspect 94, wherein: determining the parameter for the current sample comprises providing, as input to a look-up table that maps between inputs and parameters, the first integer multiple of the historic parameter value; and the first integer multiple and the threshold amount are a same value.

Aspect 96: The method of Aspect 94, further comprising: based at least in part on a determination that the number of neighboring transform coefficients is greater than zero, determining the parameter for the current sample based on a second integer multiple of the historic parameter value and a sum of the neighboring transform coefficients, wherein the second integer multiple is less than the first integer multiple.

Aspect 97: The method of Aspect 96, wherein determining the parameter for the current sample comprises providing, as input to a look-up table that maps between inputs and parameters, the second integer multiple of the historic parameter value summed with the sum of the neighboring transform coefficients.

Aspect 98: The method of any of Aspects 93 to 97, wherein: determining that the number of neighboring transform coefficients is less than the threshold amount is based at least in part on identifying one or more unavailable neighboring transform coefficients for the current sample; and the one or more unavailable neighboring transform coefficients are associated with a location outside of the transform block.

Aspect 99: The method of Aspect 98, further comprising: obtaining a location of the current sample within the transform block; comparing the location of the current sample to one or more of a width of the transform block and a height of the transform block; and based at least in part on the comparison, identifying the one or more unavailable neighboring transform coefficients.

Aspect 100: The method of Aspect 99, wherein determining that the number of neighboring transform coefficients is less than the threshold amount comprises: determining that a horizontal component of the location of the current sample is within a first distance of the width of the transform block; and determining that a vertical component of the location of the current sample is within a second distance of the height of the transform block.

Aspect 101: The method of any of Aspects 93 to 100, wherein: the plurality of samples is associated with a transform block sample type, the transform block sample type including luma samples or chroma samples; and the transform block sample type is the same as a sample type associated with the one or more previously decoded transform blocks from which the historic parameter value is determined.

Aspect 102: The method of any of Aspects 93 to 101, wherein the historic parameter value is determined based at least in part on a first non-zero decoded transform coefficient obtained from each of the one or more previously coded transform blocks.

Aspect 103: The method of Aspect 102, further comprising: determining a binary codelength for each first non-zero decoded transform coefficient obtained from each of the one or more previously coded transform blocks; wherein the historic parameter value is determined as an exponential weighted moving average of the binary codelength determined for the first non-zero coded transform coefficient of each of the one or more previously coded transform blocks.

Aspect 104: The method of any of Aspects 93 to 103, wherein the one or more parameters for the plurality of samples include one or more rice parameters, the historic parameter value is a historic rice parameter value, and the parameter determined for the current sample is a rice parameter for the current sample.

Aspect 105: An apparatus for encoding video data, comprising: at least one memory; and at least one processor coupled to the at least one memory, the at least one processor configured to: obtain a transform block; determine one or more non-zero coded transform coefficients at least in part based on an analysis of the transform block; determine, based on at least a portion of the one or more non-zero coded transform coefficients, a history update value for the transform block; update an existing historic parameter value at least in part by averaging the history update value for the transform block with the existing historic parameter value, the existing historic parameter value based at least in part on a series of non-zero coded transform coefficients determined from a series of previously analyzed transform blocks; and generate a bitstream based on the existing historic parameter value or the updated existing historic parameter value.

Aspect 106: The apparatus of Aspect 105, wherein, to update the existing historic parameter value, the at least one processor is configured to: determine an exponential weighted moving average between the history update value for the transform block and the existing historic parameter value.

Aspect 107: The apparatus of Aspect 106, wherein the at least one processor is configured to: assign a first weight to the history update value for the transform block and a second weight to the existing historic parameter value; and determine the exponential weighted moving average based at least in part on the first weight and the second weight.

Aspect 108: The apparatus of any of Aspects 105 to 107, wherein the at least one processor is configured to determine the history update value for the transform block based on a first non-zero coded transform coefficient determined in the analysis of the transform block.

Aspect 109: The apparatus of Aspect 108, wherein the at least one processor is configured to determine the first non-zero coded transform coefficient based on a run scan order of the transform block in inverse direction.

Aspect 110: The apparatus of Aspect 108, wherein the at least one processor is configured to determine the history update value for the transform block at least in part by determining a binary codelength of the first non-zero coded transform coefficient.

Aspect 111: The apparatus of any of Aspects 105 to 110, wherein: the transform block and the previously analyzed transform blocks are associated with a first slice; and the at least one processor is configured to iteratively update the existing historic parameter value based on successive history update values determined for successively analyzed transform blocks associated with a same slice.

Aspect 112: The apparatus of Aspect 111, wherein the at least one processor is configured to initialize the existing historic parameter value to a pre-determined value, wherein the initializing is performed prior to analyzing a first transform block of the first slice and determining a history update value for the first transform block.

Aspect 113: The apparatus of any of Aspects 105 to 112, wherein the at least one processor is configured to determine the history update value for the transform block based on all of the non-zero coded transform coefficients of the transform block.

Aspect 114: The apparatus of Aspect 113, wherein the at least one processor is configured to determine the history update value at least in part by averaging all of the non-zero coded transform coefficients of the transform block.

Aspect 115: The apparatus of any of Aspects 105 to 114, wherein the existing historic parameter value is an existing historic rice parameter value.

Aspect 116: A non-transitory computer-readable storage medium having stored thereon instructions which, when executed by one or more processors, cause the one or more processors to perform any of the operations of Aspects 93 to 115.

Aspect 117: An apparatus comprising means for performing any of the operations of Aspects 93 to 115.

What is claimed is:

1. A method of decoding video data, the method comprising:
   obtaining a transform block, the transform block including a plurality of samples;
   determining one or more rice parameters for the plurality of samples at least in part by analyzing a local neighborhood of a current sample of the plurality of samples;
   determining, based at least in part on the analysis of the local neighborhood, that a number of neighboring transform coefficients of the current sample is less than a threshold amount, wherein the determining includes identifying one or more unavailable neighboring transform coefficients for the current sample;
   obtaining a historic rice parameter value determined from one or more previously decoded transform blocks;
   based at least in part on using the historic rice parameter value for each unavailable neighboring transform coefficient of the one or more unavailable neighboring transform coefficients, determining a rice parameter for the current sample; and
   decoding the current sample based on the determined rice parameter for the current sample.

2. The method of claim 1, further comprising:
   based at least in part on a determination that the number of neighboring transform coefficients is zero, determining the rice parameter for the current sample based on a first integer multiple of the historic rice parameter value.

3. The method of claim 2, wherein determining the rice parameter for the current sample comprises providing, as input to a look-up table that maps between inputs and rice parameters, the first integer multiple of the historic rice parameter value.

4. The method of claim 2, wherein the first integer multiple and the threshold amount are a same value.

5. The method of claim 2, further comprising:
   based at least in part on a determination that the number of neighboring transform coefficients is greater than zero, determining the rice parameter for the current sample based on a second integer multiple of the historic rice parameter value and a sum of the neighboring transform coefficients.

6. The method of claim 5, wherein determining the rice parameter for the current sample comprises providing, as input to a look-up table that maps between inputs and rice parameters, the second integer multiple of the historic rice parameter value summed with the sum of the neighboring transform coefficients.

7. The method of claim 6, wherein the second integer multiple is less than the first integer multiple.

8. The method of claim 1, further comprising:
   obtaining a location of the current sample within the transform block;
   comparing the location of the current sample to one or more of a width of the transform block and a height of the transform block; and
   based at least in part on the comparison, identifying the one or more unavailable neighboring transform coefficients.

9. The method of claim 8, wherein the one or more unavailable neighboring transform coefficients are associated with a location outside of the transform block.

10. The method of claim 8, wherein determining that the number of neighboring transform coefficients is less than the threshold amount comprises:
    determining that a horizontal component of the location of the current sample is within a first distance of the width of the transform block; and
    determining that a vertical component of the location of the current sample is within a second distance of the height of the transform block.

11. The method of claim 1, wherein the plurality of samples is associated with a transform block sample type, the transform block sample type including luma samples or chroma samples.

12. The method of claim 11, wherein the transform block sample type is the same as a sample type associated with the one or more previously decoded transform blocks from which the historic rice parameter value is determined.

13. The method of claim 1, wherein the historic rice parameter value is determined based at least in part on a first non-zero decoded transform coefficient obtained from each of the one or more previously decoded transform blocks.

14. The method of claim 13, further comprising determining a binary codelength for each first non-zero decoded transform coefficient obtained from each of the one or more previously decoded transform blocks.

15. The method of claim 14, wherein the historic rice parameter value is determined as an exponential weighted moving average of the binary codelength determined for the first non-zero decoded transform coefficient of each of the one or more previously decoded transform blocks.

16. The method of claim 1, wherein decoding the current sample based on the determined rice parameter for the current sample comprises decoding a syntax element indicative of the current sample based on the determined rice parameter.

17. The method of claim 1, wherein decoding the current sample based on the determined rice parameter comprises decoding a Golomb-Rice code using the determined rice parameter.

18. An apparatus for decoding video data, comprising:
    at least one memory; and
    at least one processor coupled to the at least one memory, the at least one processor configured to:
        obtain a transform block, the transform block including a plurality of samples;
        determine one or more rice parameters for the plurality of samples at least in part by analyzing a local neighborhood of a current sample of the plurality of samples;
        determine, based at least in part on the analysis of the local neighborhood to identify one or more unavailable neighboring transform coefficients for the current sample, that a number of neighboring transform coefficients of the current sample is less than a threshold amount;
        obtain a historic rice parameter value determined from one or more previously decoded transform blocks;
        based at least in part on using the historic rice parameter value for each unavailable neighboring transform coefficient of the one or more unavailable neighboring transform coefficients, determine a rice parameter for the current sample; and
        decode the current sample based on the determined rice parameter for the current sample.

19. The apparatus of claim 18, wherein the at least one processor is configured to:
based at least in part on a determination that the number of neighboring transform coefficients is zero, determine the rice parameter for the current sample based on a first integer multiple of the historic rice parameter value.

20. The apparatus of claim 19, wherein, to determine the rice parameter for the current sample, the at least one processor is configured to:
provide, as input to a look-up table that maps between inputs and rice parameters, the first integer multiple of the historic rice parameter value.

21. The apparatus of claim 19, wherein the first integer multiple and the threshold amount are a same value.

22. The apparatus of claim 19, wherein the at least one processor is configured to:
based at least in part on a determination that the number of neighboring transform coefficients is greater than zero, determine the rice parameter for the current sample based on a second integer multiple of the historic rice parameter value and a sum of the neighboring transform coefficients.

23. The apparatus of claim 22, wherein, to determine the rice parameter for the current sample, the at least one processor is configured to:
provide, as input to a look-up table that maps between inputs and rice parameters, the second integer multiple of the historic rice parameter value summed with the sum of the neighboring transform coefficients.

24. The apparatus of claim 23, wherein the second integer multiple is less than the first integer multiple.

25. The apparatus of claim 18, wherein the at least one processor is configured to:
obtain a location of the current sample within the transform block;
compare the location of the current sample to one or more of a width of the transform block and a height of the transform block; and
based at least in part on the comparison, identify the one or more unavailable neighboring transform coefficients.

26. The apparatus of claim 25, wherein the one or more unavailable neighboring transform coefficients are associated with a location outside of the transform block.

27. The apparatus of claim 25, wherein, to determine that the number of neighboring transform coefficients is less than the threshold amount, the at least one processor is configured to:
determine that a horizontal component of the location of the current sample is within a first distance of the width of the transform block; and
determine that a vertical component of the location of the current sample is within a second distance of the height of the transform block.

28. The apparatus of claim 27, wherein the plurality of samples is associated with a transform block sample type, the transform block sample type including luma samples or chroma samples.

29. The apparatus of claim 28, wherein the transform block sample type is the same as a sample type associated with the one or more previously decoded transform blocks from which the historic rice parameter value is determined.

30. The apparatus of claim 27, wherein the at least one processor is configured to:
determine the historic rice parameter value based at least in part on a first non-zero decoded transform coefficient obtained from each of the one or more previously decoded transform blocks.

31. The apparatus of claim 30, wherein the at least one processor is configured to:
determine a binary codelength for each first non-zero decoded transform coefficient obtained from each of the one or more previously decoded transform blocks.

32. The apparatus of claim 31, wherein the at least one processor is configured to:
determine the historic rice parameter value as an exponential weighted moving average of the binary codelength determined for the first non-zero decoded transform coefficient of each of the one or more previously decoded transform blocks.

33. The apparatus of claim 18, wherein, to decode the current sample based on the determined rice parameter for the current sample, the at least one processor is configured to:
decode a syntax element indicative of the current sample based on the determined rice parameter.

34. The apparatus of claim 18, wherein, to decode the current sample based on the determined rice parameter for the current sample, the at least one processor is configured to:
decode a Golomb-Rice code using the determined rice parameter.

* * * * *